(12) United States Patent
Hamamoto et al.

(10) Patent No.: US 11,624,421 B2
(45) Date of Patent: Apr. 11, 2023

(54) TRANSMISSION V-BELT AND MANUFACTURING METHOD THEREFOR

(71) Applicant: Mitsuboshi Belting Ltd., Kobe (JP)

(72) Inventors: Kouhei Hamamoto, Hyogo (JP); Toshihiro Nishimura, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 900 days.

(21) Appl. No.: 16/479,834

(22) PCT Filed: Jan. 26, 2018

(86) PCT No.: PCT/JP2018/002458
§ 371 (c)(1),
(2) Date: Jul. 22, 2019

(87) PCT Pub. No.: WO2018/139578
PCT Pub. Date: Aug. 2, 2018

(65) Prior Publication Data
US 2021/0102601 A1    Apr. 8, 2021

(30) Foreign Application Priority Data

Jan. 26, 2017 (JP) .............................. JP2017-011806
Jan. 15, 2018 (JP) .............................. JP2018-004453

(51) Int. Cl.
*F16G 5/08* (2006.01)
*D04H 1/4242* (2012.01)
(Continued)

(52) U.S. Cl.
CPC .............. *F16G 5/08* (2013.01); *B29D 29/106* (2013.01); *D04H 1/4242* (2013.01); *F16G 5/20* (2013.01)

(58) Field of Classification Search
CPC ........... F16G 5/08; F16G 5/20; D04H 1/4242; B29D 29/106
See application file for complete search history.

(56) References Cited

U.S. PATENT DOCUMENTS 3,485,707 A    12/1969   Spicer
3,820,409 A *  6/1974   Meadows ............... F16G 5/166
                                                    474/261
(Continued)

FOREIGN PATENT DOCUMENTS

CN    101160478 A    4/2008
CN    105190089 A    12/2015
(Continued)

OTHER PUBLICATIONS

Translation of JPH0620936; Mar. 1994 (Year: 1994).*
(Continued)

*Primary Examiner* — Michael R Mansen
*Assistant Examiner* — Mark K Buse
(74) *Attorney, Agent, or Firm* — Banner & Witcoff, Ltd.

(57) ABSTRACT

Provided is a power transmission V-belt containing: a rubber layer; a cord buried in the rubber layer along the belt circumferential direction; and at least one reinforcing layer buried in the rubber layer, in which the reinforcing layer contains reinforcing fiber filaments having the same length as a belt width; and contains no fibers intersecting with the belt width direction, or contains the fibers intersecting with the belt width direction in a weight per unit area of 30% or less of the reinforcing fiber filaments, in which the reinforcing layer has a structure in which the reinforcing fiber filaments are in a non-twisted state, are oriented in the belt width direction, and are spread and bonded in a sheet shape, and in which the reinforcing layer has a thickness of 0.05 mm to 0.5 mm.

20 Claims, 11 Drawing Sheets

(51) Int. Cl.
    *F16G 5/20*       (2006.01)
    *B29D 29/10*      (2006.01)

(56)         References Cited

U.S. PATENT DOCUMENTS

| | | | |
|---|---|---|---|
| 3,863,516 A * | 2/1975 | Fisher | F16G 5/08 |
| | | | 474/271 |
| 4,022,070 A | 5/1977 | Wolfe | |
| 4,443,280 A * | 4/1984 | Standley | F16G 5/08 |
| | | | 428/920 |
| 5,244,436 A * | 9/1993 | Kurokawa | F16G 5/06 |
| | | | 474/260 |
| 5,521,007 A | 5/1996 | Kurokawa | |
| 5,860,883 A | 1/1999 | Jonen et al. | |
| 2009/0081473 A1 | 3/2009 | Ohno | |
| 2015/0024892 A1 * | 1/2015 | Hineno | B29C 35/02 |
| | | | 474/237 |
| 2016/0053851 A1 * | 2/2016 | Kojima | F16G 5/08 |
| | | | 474/265 |
| 2016/0298725 A1 | 10/2016 | Ishiguro et al. | |
| 2017/0037933 A1 * | 2/2017 | Takami | F16G 1/08 |
| 2017/0314641 A1 * | 11/2017 | Kamba | F16G 1/28 |

FOREIGN PATENT DOCUMENTS

| | | |
|---|---|---|
| CN | 106103028 A | 11/2016 |
| FR | 2503305 A1 | 10/1982 |
| JP | S59-007859 B2 | 2/1984 |
| JP | H04-219545 A | 8/1992 |
| JP | H05-063656 B2 | 9/1993 |
| JP | H06-020936 U | 3/1994 |
| JP | 2010-196889 A | 9/2010 |
| WO | 2015-159795 A1 | 10/2015 |

OTHER PUBLICATIONS

Mar. 13, 2018—International Search Report—Intl App PCT/JP2018/002458.
Jun. 11, 2019—(JP) Notification of Reasons for Refusal—App 2018-004453.
May 6, 2021—(CN) Notification of the Second Office Action—App 201880007489.1.
Jul. 30, 2019—(JP) Notification of Reasons for Refusal—App 2018-004453.
Sep. 29, 2020—(EP) Search Report—App 18744973.1.
Jun. 3, 2020—(CN) Notification of First Office Action—App 201880007489.1.

* cited by examiner

[FIG. 1]
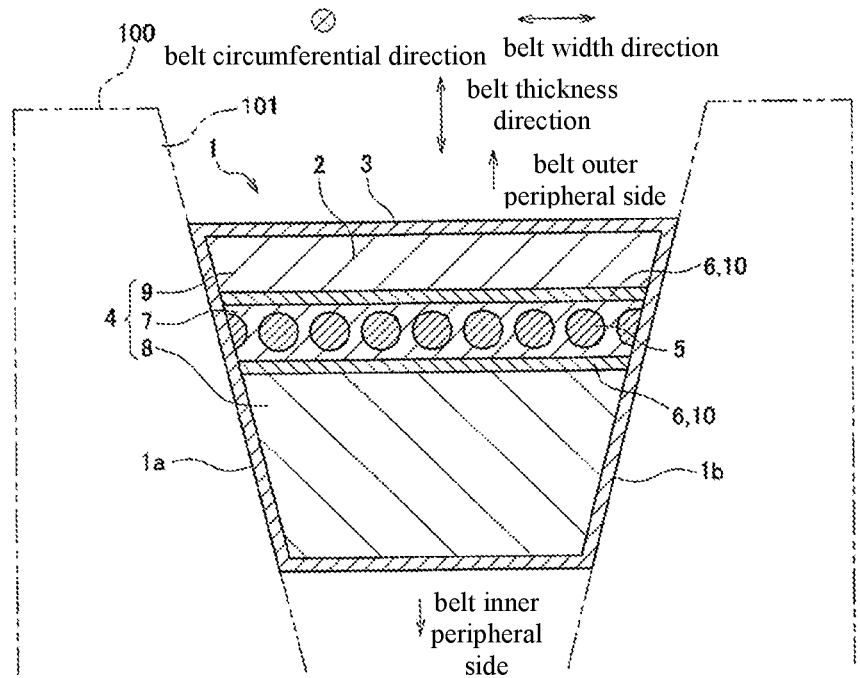
[FIG. 2]
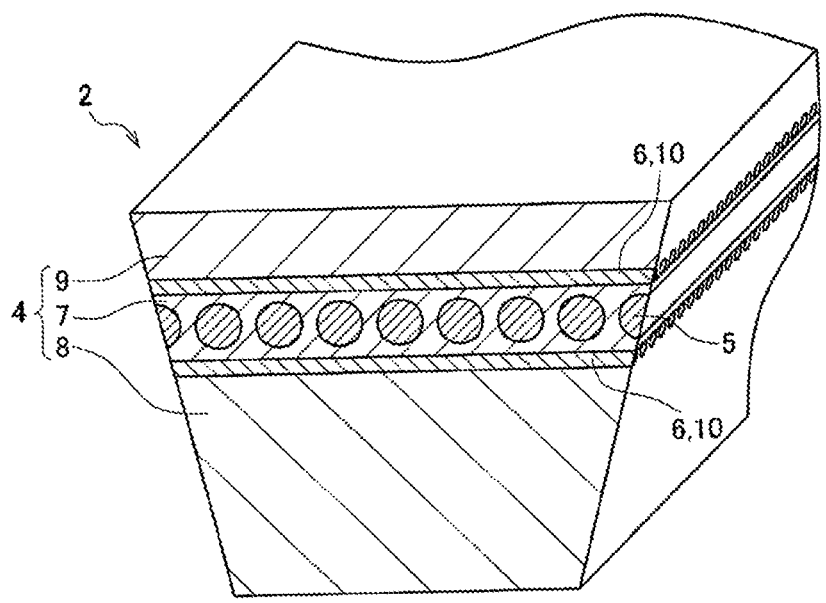

[FIG. 3]
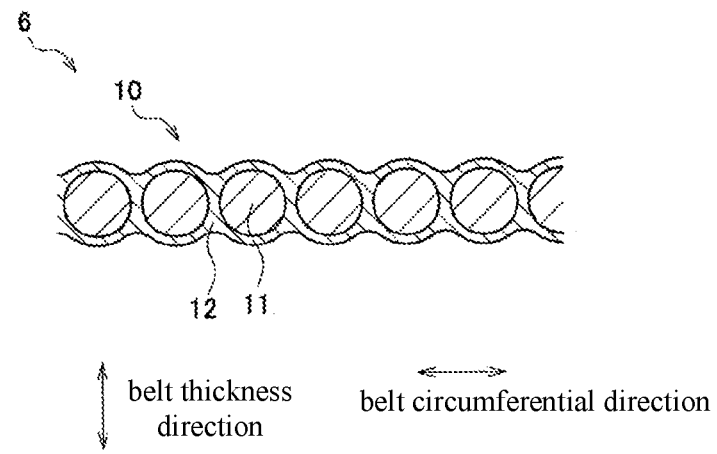
belt thickness direction
belt circumferential direction
[FIG. 4]
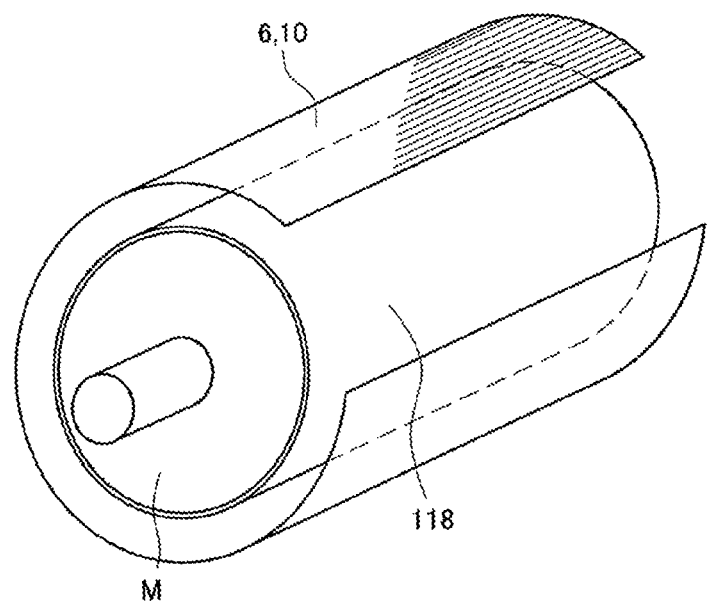

[FIG. 5]
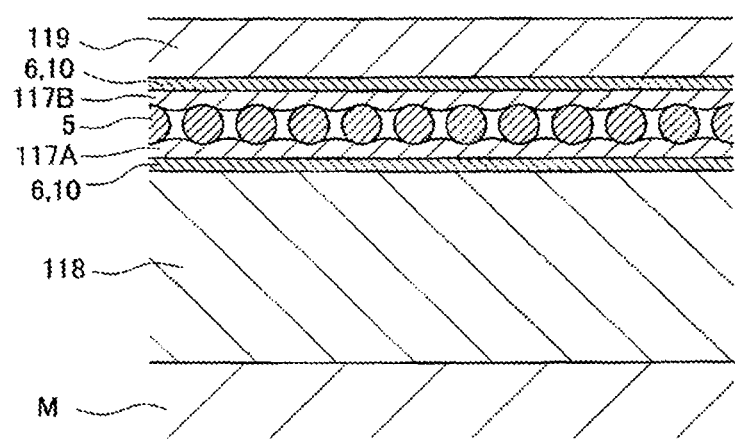

[FIG. 6]
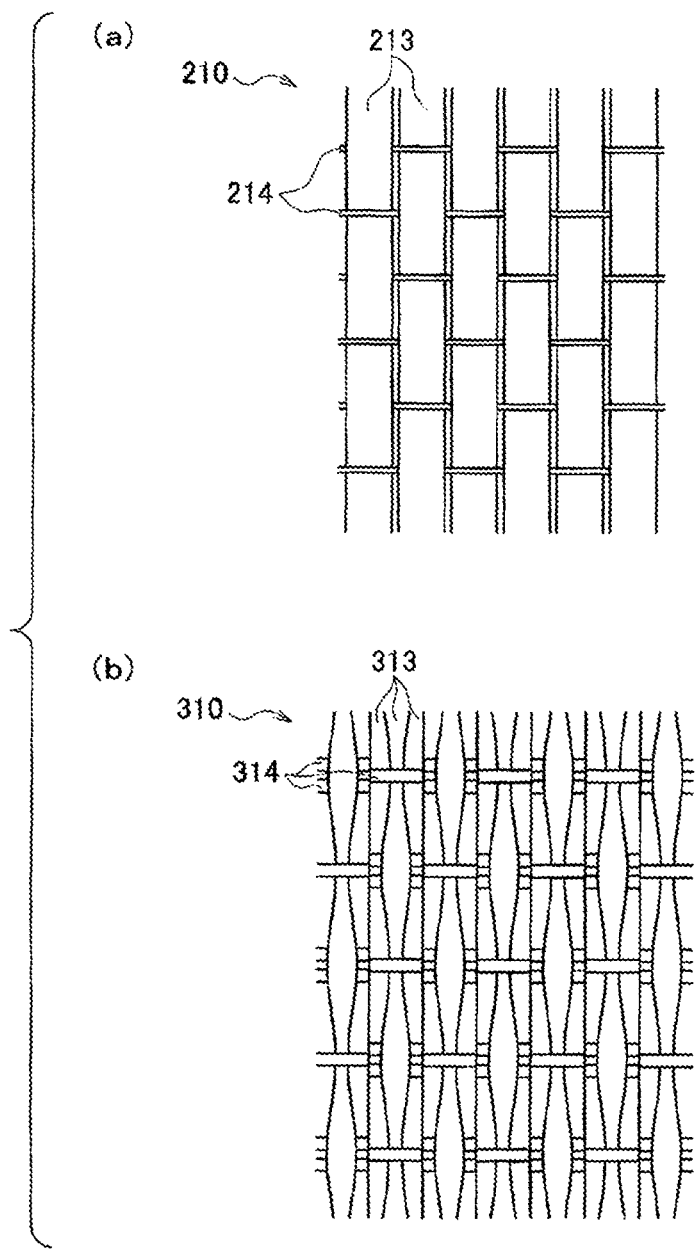

[FIG. 7]
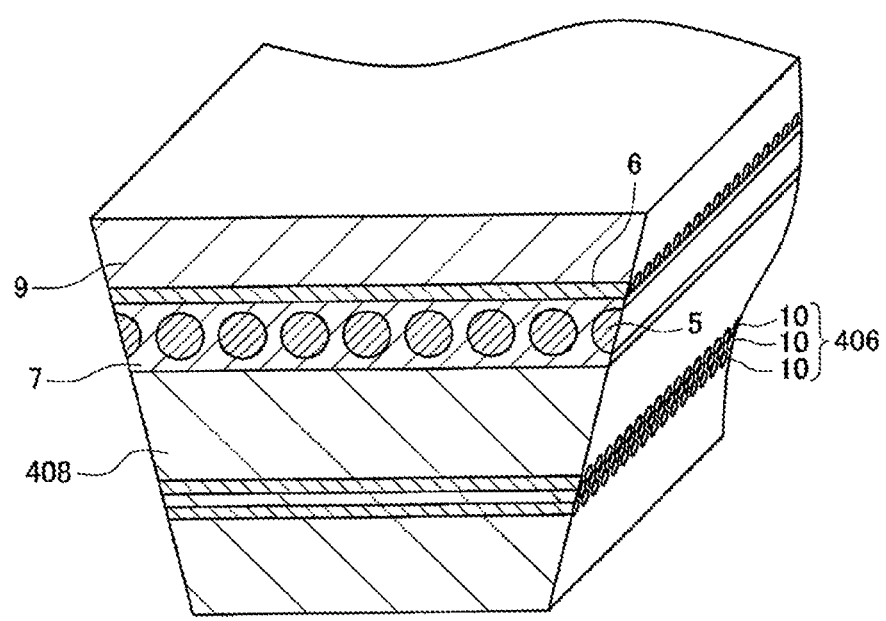

[FIG. 8]
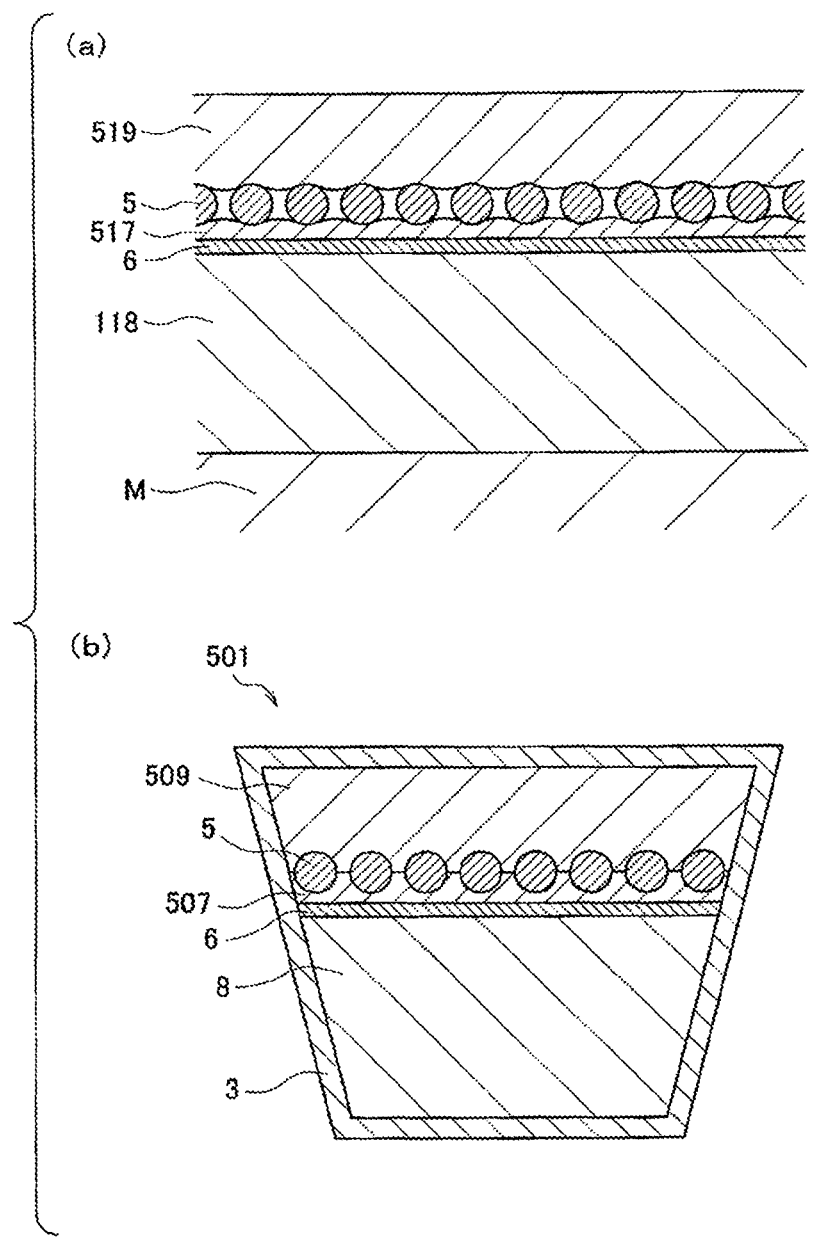

[FIG. 9]
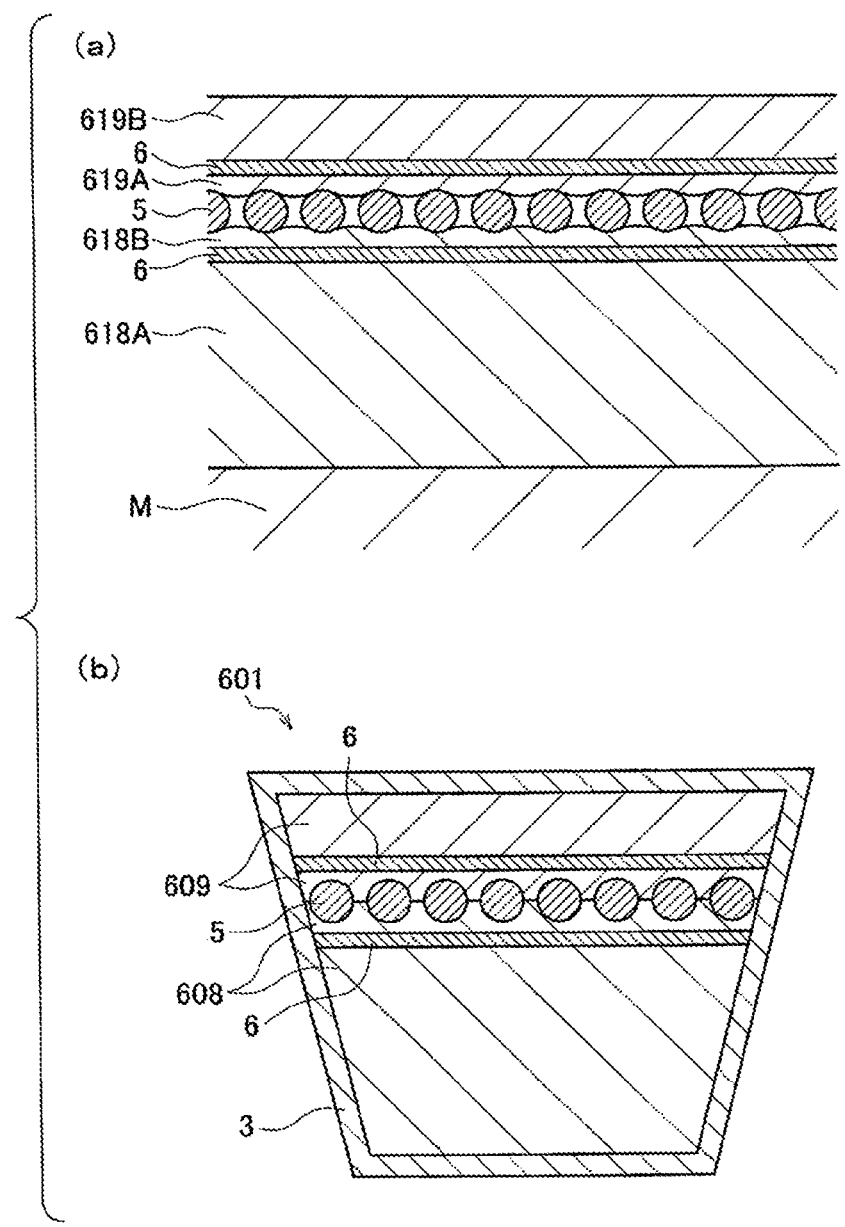

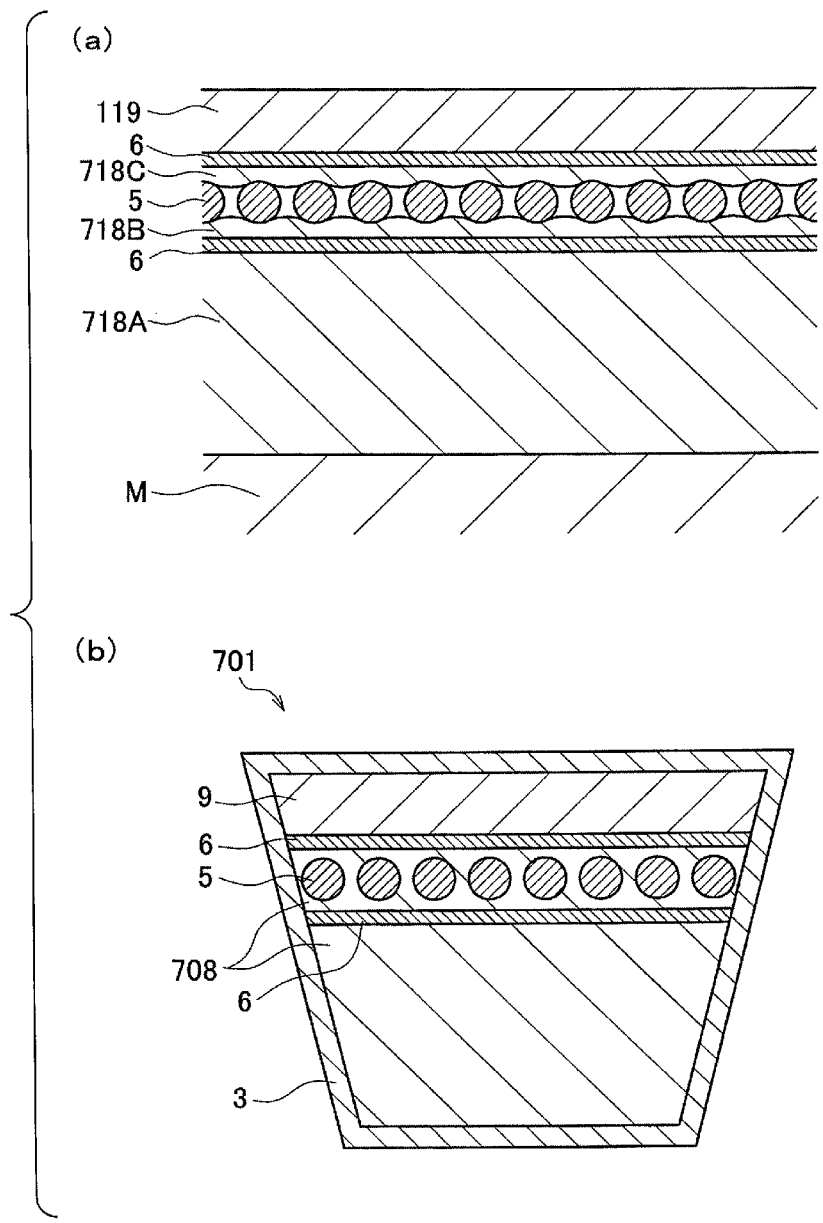
[FIG. 10]

[FIG. 11]
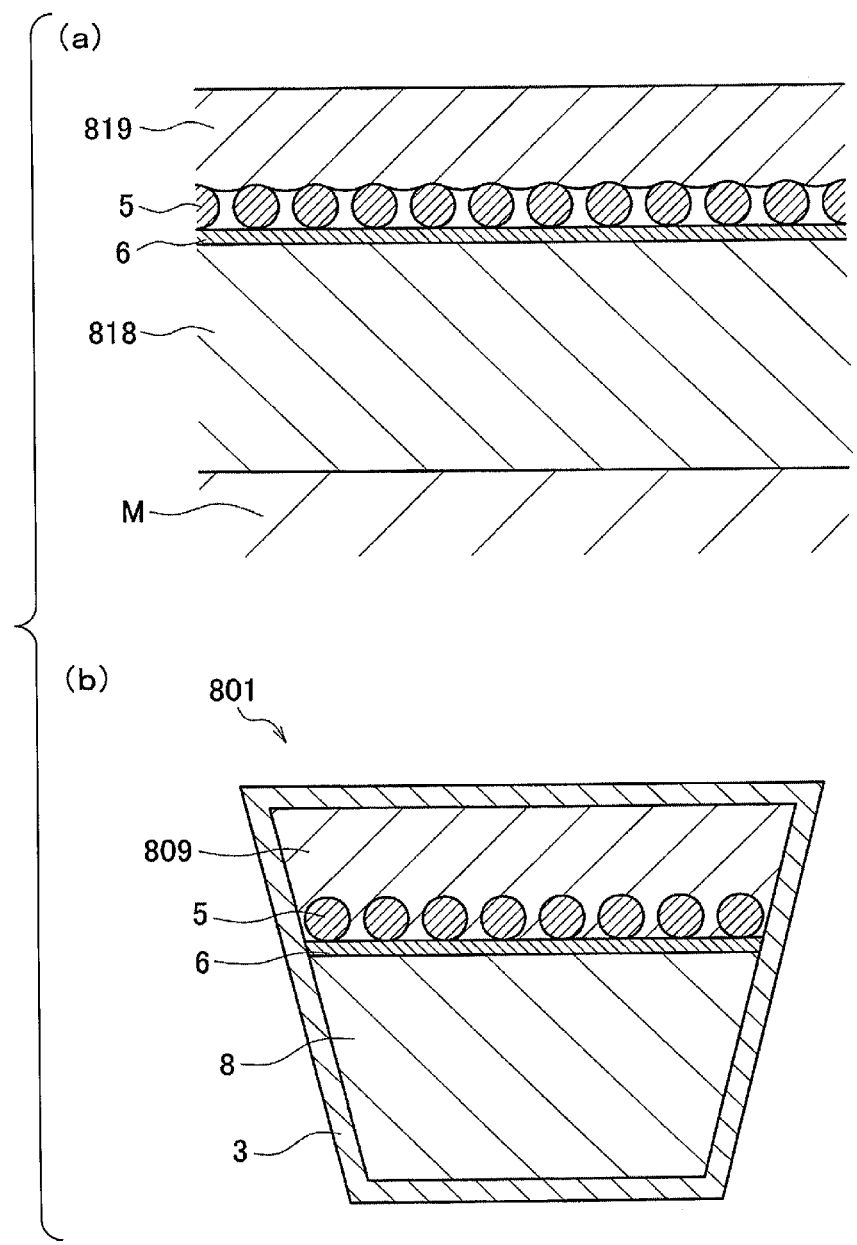

[FIG. 12]
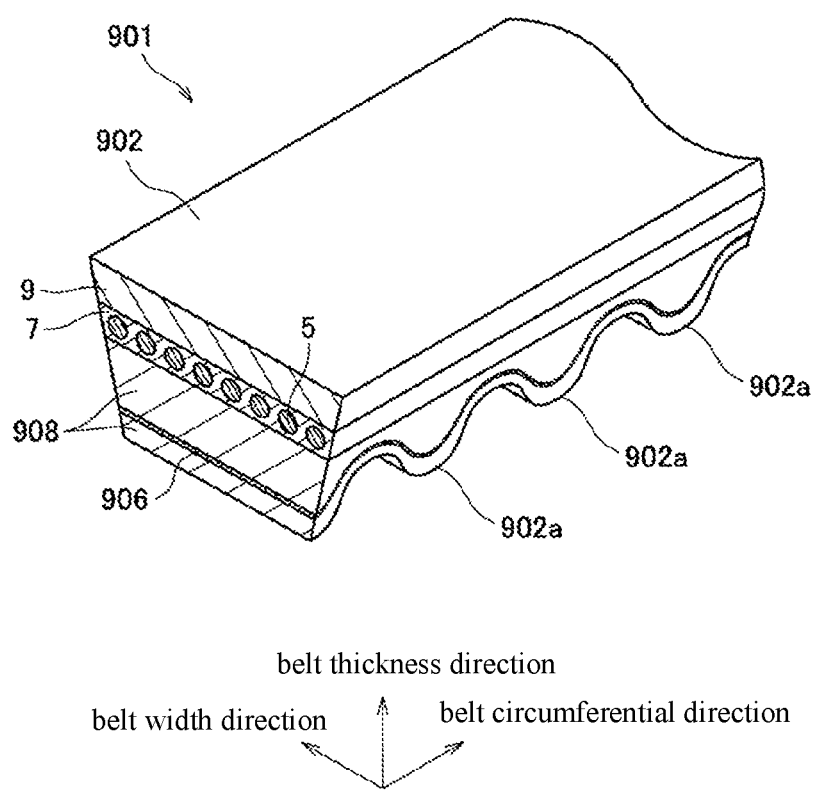
belt thickness direction
belt width direction    belt circumferential direction

[FIG. 13]
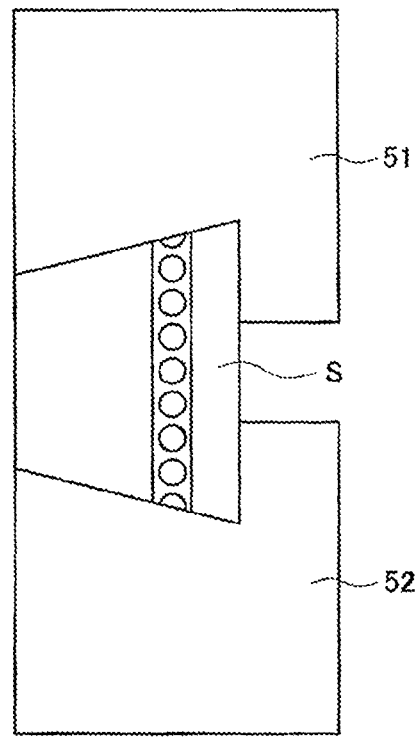
[FIG. 14]
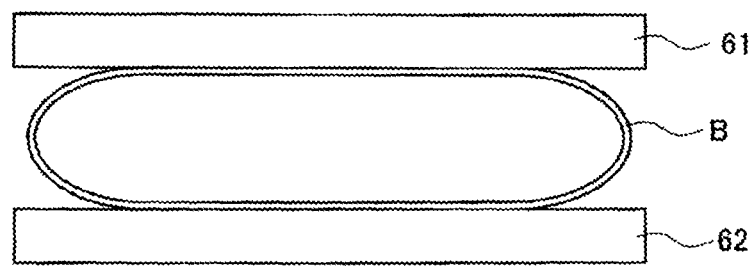

TRANSMISSION V-BELT AND MANUFACTURING METHOD THEREFOR

CROSS REFERENCE TO RELATED APPLICATIONS

This is a U.S. National Phase Application under 35 U.S.C. § 371 of International Application No. PCT/JP2018/002458, filed Jan. 26, 2018, which claims priority to Japanese Application Nos. 2017-011806, filed Jan. 26, 2017 and 2018-004453, filed Jan. 15, 2018, which was published Under PCT Article 21(2), the entire contents of which are incorporated herein by reference.

TECHNICAL FIELD

The present invention relates to a power transmission V-belt having a cross section, which is orthogonal to a belt circumferential direction, being a V shape and having a frictional power transmission surface on both sides in a belt width direction; and a method of manufacturing the same.

BACKGROUND ART

Power transmission V-belts includes Raw Edge V-belts whose frictional power transmission surface is rubber, and Wrapped V-belts whose frictional power transmission surface is covered with a cover fabric, and they are selected and used depending on application due to differences in surface properties (friction coefficient, etc.) of frictional power transmission surfaces. These power transmission V-belts are widely used in fields such as automobiles, agricultural machines, and industrial machines.

Engine of automobiles in recent years are required to have a small size and a high output. Therefore, power transmission V-belts used in automobiles are required to have improved flexibility to cope with a reduction in size of pulleys, and improved resistance to lateral pressure to transmit power at a high load.

Agricultural machines have been increased in size to accommodate large-scale agriculture. Belt mechanism in a large agricultural machine runs continuously for a long period of time with a high load and a high tension. The belt mechanism in a large agricultural machine generally has a multi-axis layout. Therefore, power transmission V-belts used in a large agricultural machine are required to have improved resistance to lateral pressure and good flexibility to be applicable to the multi-axis layout.

In this manner, power transmission V-belts are required to achieve both resistance to lateral pressure and flexibility in high levels. When the resistance to lateral pressure is insufficient, the belt falls into a pulley to cause buckling deformation called dishing, and belt life decreases due to heat generation in the belt or peeling between components of the belt. When the flexibility decreases, heat generation due to bending when the belt is wound around or separated from the pulley is large, and components of the belt including rubber thermally degrade, leading to a decrease in the belt life.

Therefore, various methods have been proposed to improve resistance to lateral pressure while maintaining good flexibility. For example, in Patent Literature 1, short fibers oriented in a belt width direction are buried in a compression rubber layer of a belt in a dispersed manner. In Patent Literature 2, transverse blinds-like cords are buried in a compression rubber layer. The transverse blinds-like cords are formed by arranging cords of aramid fibers or the like side by side along a belt width direction, and connecting them each other by a fine yarn. In Patent Literature 3, a reinforcing layer formed of a fiber-reinforced resin is buried in a compression rubber layer. The reinforcing layer contains carbon fibers oriented in a belt width direction.

CITATION LIST

Patent Literature

Patent Literature 1: JP-B-H05-63656
Patent Literature 2: JP-B-S59-7859
Patent Literature 3: JP-A-2010-196889

SUMMARY OF INVENTION

Technical Problem

However, power transmission V-belts as described in Patent Literatures 1 to 3 have problems such as low flexibility, insufficient resistance to lateral pressure, increased belt temperature, and the like.

In a method of blending short fibers as described in Patent Literature 1, orientation of the short fibers is easily disturbed, and it is difficult to sufficiently enhance the orientation property in the belt width direction. In the case where the orientation property in the belt width direction is low, sufficient resistance to lateral pressure cannot be ensured. An amount of short fibers oriented in the belt width direction can be ensured when a blending amount of short fibers can be increased, even if the orientation is disturbed. However, the blending amount of short fibers is limited in view of processability. Furthermore, in the case where the orientation of short fibers is disturbed, the flexibility of the belt decreases due to short fibers oriented in a belt circumferential direction. When the flexibility decreases, heat generation due to bending is likely to occur. Accordingly, belt temperature during running increases and belt life is shortened due to thermal degradation of rubber.

In the transverse blinds-like cords disclosed in Patent Literature 2, twisted cords in which fibers are twisted are used as cords arranged along the belt width direction. Since stretchability is imparted when a twist exists, the resistance to lateral pressure is likely to decrease. Furthermore, since filaments of spiral form due to being twisted are not strictly oriented in the belt width direction, the resistance to lateral pressure is not improved sufficiently. Furthermore, the twisted cords are likely to generate heat due to friction between fibers when the belt is bent. Accordingly, belt temperature during running may increase, and belt life may be shortened due to thermal degradation of rubber. Furthermore, the thickness of the reinforcing layer may be increased since the twisted cords are used, and the flexibility may decrease.

In a method in which a reinforcing layer formed of a fiber-reinforced resin is buried in a compression rubber layer as described in Patent Literature 3, an orientation property in the belt width direction can be improved and resistance to lateral pressure can be improved as compared with the case of blending short fibers. However, Patent Literature 3 does not describe whether fibers constituting the fiber-reinforced resin are twisted. Therefore, Patent Literature 3 is unclear whether heat generation due to friction between fibers of the fiber-reinforced resin is less likely to occur. Furthermore, Patent Literature 3 does not define the thickness of the reinforcing layer.

An object of the present invention is to provide a power transmission V-belt that can improve resistance to lateral pressure while preventing heat generation of the belt and a decrease in flexibility, and a method of manufacturing the same.

Solution to Problem

A power transmission V-belt according to a first aspect of the present invention is a power transmission V-belt having a cross section orthogonal to a belt circumferential direction being a V shape, and having a frictional power transmission surface on each side in a belt width direction, in which the power transmission V-belt includes: a rubber layer formed of a rubber composition; a cord buried in the rubber layer along the belt circumferential direction; and at least one reinforcing layer buried in the rubber layer, in which the reinforcing layer contains a large number of reinforcing fiber filaments having the same length as a belt width; and contains no fibers that intersect with the belt width direction, or contains the fibers that intersect with the belt width direction in a weight per unit area of 30% or less of the reinforcing fiber filaments, in which the reinforcing layer has a structure in which the reinforcing fiber filaments are in a non-twisted state, are oriented in the belt width direction, and are spread and bonded in a sheet shape, and in which the reinforcing layer has a thickness of 0.05 to 0.5 mm.

According to this configuration, a large number of reinforcing fiber filaments are buried in the rubber layer as the reinforcing layer in a state of being spread in a sheet shape while being oriented in the belt width direction. Therefore, resistance to lateral pressure of the power transmission V-belt can be improved as compared with the case where the reinforcing layer is not provided or the case where short fibers oriented in the belt width direction are buried in the rubber layer in a dispersed manner. Furthermore, orientations of the reinforcing fiber filaments can be prevented from being disturbed since the large number of reinforcing fiber filaments constituting the reinforcing layer are spread and bonded in a sheet shape. Accordingly, the resistance to lateral pressure can be improved more reliably. Since the resistance to lateral pressure is improved, life of the power transmission V-belt can be prolonged.

The reinforcing layer does not contain fibers that intersect in the belt width direction at all, or contains such fibers in an amount of 30% or less of a weight per unit area of the reinforcing fiber filaments. Therefore, substantially the same flexibility as in the case where the reinforcing layer is not provided can be ensured. That is, it is possible to prevent a decrease in the flexibility of the power transmission V-belt. Furthermore, the thickness of the reinforcing layer can be reduced while ensuring a high resistance to lateral pressure by burying the reinforcing fiber filaments in a non-twisted state. Accordingly, it is possible to further prevent a decrease in flexibility. In the present invention, "non-twisted" means that the number of twists is 1/10 cm or small.

Since the reinforcing fiber filaments are buried in a non-twisted state, heat generation due to friction between fibers hardly occurs during bending. Furthermore, by preventing the decrease in flexibility, it is possible to prevent heat generation of the belt due to bending when the belt is wound around or separated from the pulley. Therefore, it is possible to prevent an increase in belt temperature during running By preventing the increase in belt temperature, it is possible to further prolong the life of the power transmission V-belt.

The thickness of the reinforcing layer is 0.05 to 0.5 mm. In the case where the thickness of the reinforcing layer exceeds 0.5 mm, flexibility may decrease, and heat generated by the belt due to bending may increase. In the present invention, by setting the thickness of the reinforcing layer 6 to be 0.5 mm or small, decrease in flexibility and heat generation of the belt can be reliably prevented. In the case where the thickness of the reinforcing layer is less than 0.05 mm, sufficient resistance to lateral pressure may not be ensured in some cases. In the present invention, the non-twisted reinforcing fiber filaments have a good effect in improving the resistance to lateral pressure. Therefore, sufficient resistance to lateral pressure can be ensured even if the reinforcing layer is as thin as 0.05 to 0.5 mm. In the present invention, "thickness of the reinforcing layer" refers to the thickness of each reinforcing layer even in the case where there are a plurality of reinforcing layers.

Since the reinforcing fiber filaments are spread and bonded in a sheet shape and are not loosened, handling of the reinforcing layer is easy during belt manufacturing. Specifically, it is possible to easily perform an operation of winding a sheet that serves as the reinforcing layer on unvulcanized rubber, and an operation of applying an adhesive treatment such as an RFL treatment or a rubber cement treatment to the reinforcing layer.

A power transmission V-belt according to a second aspect is that, in the first aspect, the reinforcing fiber filaments have a tensile modulus of elasticity of 200 to 600 GPa.

In the case where the tensile modulus of elasticity of the reinforcing fiber filaments is less than 200 GPa, sufficient resistance to lateral pressure may not be ensured in some cases. In the present invention, the tensile modulus of elasticity of the reinforcing fiber filaments is 200 GPa or more, which makes it possible to ensure sufficient resistance to lateral pressure while reducing the thickness of the reinforcing layer and preventing a decrease in flexibility.

In the case where the tensile modulus of elasticity of the reinforcing fiber filaments exceeds 600 GPa, the reinforcing fiber filaments are less likely to follow a deformation of the belt. As a result, peeling is likely to occur between the reinforcing layer and the rubber composition, which lead to a shortening of the belt life. In the present invention, the tensile modulus of elasticity of the reinforcing fiber filaments is 600 GPa or less, which makes it possible to prevent the peeling from occurring between the reinforcing layer and the rubber composition and to prolong the belt life more.

A power transmission V-belt according to a third aspect is that, in the first or the second aspect, the reinforcing fiber filaments have a thermal conductivity of 5.0 W/(m·K) or more.

According to this configuration, heat generated in the belt due to bending or friction can be efficiently diffused into air or the pulley through the reinforcing fiber filaments having a high thermal conductivity. Therefore, an increase in belt temperature can be prevented, and the life of the power transmission V-belt can be further prolonged.

A power transmission V-belt according to a fourth aspect is that, in any one of the first to the third aspects, the reinforcing fiber filaments are carbon fibers.

According to this configuration, since the reinforcing fiber filaments are carbon fibers, the tensile modulus of elasticity of the reinforcing fiber filaments can be made to fall within the range of the second invention. Therefore, the same effect as that in the second invention can be obtained. Furthermore, since the reinforcing fiber filaments are carbon fibers, the thermal conductivity of the reinforcing fiber filaments can be made to fall within the numerical range of the third invention. Therefore, the same effect as that in the third invention can be obtained.

A power transmission V-belt according to a fifth aspect is that, in any one of the first to the fourth aspects, the reinforcing layer is buried on each side of the cord in the rubber layer.

According to this configuration, resistance to lateral pressure can be further improved since the reinforcing layer is provided on each side of the cord. Therefore, life of the power transmission V-belt can be prolonged even if it is used under high load conditions.

A power transmission V-belt according to a sixth aspect is that, in any one of the first to the fifth aspects, the rubber layer includes: an adhesion rubber layer in which at least a part of the cord is buried; a compression rubber layer formed of a rubber composition different from that of the adhesion rubber layer and provided on a belt inner circumferential side of the adhesion rubber layer; and a tension rubber layer formed of a rubber composition different from that of the adhesion rubber layer and provided on a belt outer peripheral side of the adhesion rubber layer, in which the reinforcing layer is buried at least between the adhesion rubber layer and the compression rubber layer or between the adhesion rubber layer and the tension rubber layer.

According to this configuration, the reinforcing layer is in contact with the adhesion rubber layer in which the cord is buried. That is, the reinforcing layer is buried in a position close to the cord. The power transmission V-belt is required to have higher resistance to lateral pressure as approaching the cord in the belt thickness direction. Therefore, since the reinforcing layer is buried in a position close to the cord, sufficient resistance to lateral pressure can be ensured by a relatively thin reinforcing layer. Since the thickness of the reinforcing layer is thin, a decrease in flexibility is further prevented.

In the case where the reinforcing layer is buried in the compression rubber layer (or in the tension rubber layer), it is necessary to dispose the reinforcing layer between two rubber sheets that form the compression rubber layer (or the tension rubber layer) at the time of manufacturing. In this invention, the reinforcing layer is buried between the compression rubber layer or the tension rubber layer and the adhesion rubber layer. Accordingly, the number of steps required for belt manufacturing can be reduced as compared with the case where the reinforcing layer is buried in the compression rubber layer or in the tension rubber layer.

A power transmission V-belt according to a seventh aspect is that, in any one of the first to the fifth aspects, the rubber layer includes: an adhesion rubber layer in which at least a part of the cord is buried; a compression rubber layer formed of a rubber composition different from that of the adhesion rubber layer and provided on a belt inner circumferential side of the adhesion rubber layer; and a tension rubber layer formed of a rubber composition different from that of the adhesion rubber layer and provided on a belt outer peripheral side of the adhesion rubber layer, in which the reinforcing layer is buried at least in the compression rubber layer or in the tension rubber layer.

According to this configuration, buckling deformation due to dishing is small, and heat generation of a belt and peeling between constituent members can be prevented from occurring. Therefore, life of the power transmission V-belt can be more prolonged.

A power transmission V-belt according to an eighth aspect is that, in any one of the first to the fifth aspects, the rubber layer includes: a compression rubber layer; and a tension rubber layer formed of a rubber composition different from that of the compression rubber layer and provided on a belt outer peripheral side of the compression rubber layer, in which the cord is buried in the compression rubber layer, in the tension rubber layer, or between the compression rubber layer and the tension rubber layer, and in which the reinforcing layer is buried at least in the compression rubber layer, in the tension rubber layer, or between the compression rubber layer and the tension rubber layer.

According to this configuration, the adhesion rubber layer is not necessarily provided, and the number of steps required for manufacturing the belt can be reduced.

A power transmission V-belt according to a ninth aspect is that, in any one of the sixth to the eighth aspects, the cord is not buried in the compression rubber layer, the compression rubber layer contains short fibers, and the compression rubber layer has a blending amount of the short fibers of 0.1 to 10 parts by mass with respect to 100 parts by mass of a rubber component.

In the case where the blending amount of short fibers blended in the compression rubber layer exceeds 10 parts by mass with respect to 100 parts by mass of the rubber component, flexibility is reduced and adhesiveness between the compression rubber layer and an adjacent layer decreases. Accordingly, cracks are likely to occur in the rubber. In this invention, since the blending amount of the short fibers blended in the compression rubber layer is 10 parts by mass or less with respect to 100 parts by mass of the rubber component, a decrease in flexibility and adhesiveness can be minimized, and cracks can be prevented from occurring. Therefore, life of the power transmission V-belt can be more prolonged.

In the case where the blending amount of short fibers blended in the compression rubber layer is less than 0.1 parts by mass with respect to 100 parts by mass of the rubber component, resistance to lateral pressure may be insufficient and the belt life may be shortened in some cases. In this invention, since the reinforcing layer has a good effect in improving the resistance to lateral pressure, sufficient resistance to lateral pressure can be ensured even if the blending amount of short fibers blended in the compression rubber layer is as small amount as 0.1 to 10 parts by mass with respect to 100 parts by mass of the rubber component.

A power transmission V-belt according to a tenth aspect is that, in any one of the sixth to the ninth aspects, the reinforcing layer is buried in the compression rubber layer or in contact with the compression rubber layer, the compression rubber layer contains chloroprene rubber, and in a case where the reinforcing layer is in contact with the adhesion rubber layer, the adhesion rubber layer contains chloroprene rubber.

According to this configuration, since the compression rubber layer (and the adhesion rubber layer) contains chloroprene rubber, which has good balance of various properties such as heat resistance, abrasion resistance and weather resistance, durability of the power transmission V-belt can be improved. Furthermore, an adhesive force between the reinforcing layer and the compression rubber layer (and an adhesive force between the reinforcing layer and the adhesion rubber layer) are improved, and peeling between these layers can be prevented. Accordingly, life of the power transmission V-belt can be more prolonged. Furthermore, the chloroprene rubber is relatively inexpensive, resulting in a good economic efficiency.

A power transmission V-belt according to an eleventh aspect is that, in any one of the first to the tenth aspects, the reinforcing layer is formed of one or plurally-laminated unidirectional fiber sheet(s), and the unidirectional fiber sheet has a structure in which the reinforcing fiber filaments are bonded to each other by a thermosetting resin.

According to this configuration, adhesiveness between the reinforcing fiber filaments and the rubber composition is improved by the thermosetting resin. Accordingly, life of the power transmission V-belt can be more prolonged.

A power transmission V-belt according to an twelfth aspect is that, in any one of the first to the tenth aspects, the reinforcing layer is formed of one or plurally-laminated unidirectional fiber sheet(s), and the unidirectional fiber sheet has a structure in which the reinforcing fiber filaments are bonded to each other by an auxiliary yarn intersecting with the belt width direction and having a weight per unit area being 30% or less of that of the reinforcing fiber filaments.

In the case where the reinforcing fiber filaments are bonded to each other by a resin, flexibility of a belt may decrease depending on the kind of the resin and the thickness in some cases. In this embodiment, since the reinforcing fiber filaments are bonded by the auxiliary yarn, a decrease in flexibility is prone to be prevented. Furthermore, when a strong force is applied to the unidirectional fiber sheet in a belt circumferential length direction during an adhesive treatment, molding or the like, the unidirectional fiber sheet hardly tear as compared with the case where the reinforcing fiber filaments are bonded by a resin.

In the present invention, "the reinforcing fiber filaments are bonded to each other by the auxiliary yarn" includes, for example, a case where the unidirectional fiber sheet is woven by the auxiliary yarn and a fiber bundle formed of a plurality of the reinforcing fiber filaments.

A power transmission V-belt according to a thirteenth aspect is that, in the eleventh or the twelfth aspects, the unidirectional fiber sheet containing the thermosetting resin or the auxiliary yarn has a basis weight of 50 to 400 g/m$^2$.

In the case where the basis weight of the unidirectional fiber sheet is less than 50 g/m$^2$, the number of unidirectional fiber sheets constituting the reinforcing layer necessary to ensure sufficient resistance to lateral pressure increases, and the number of steps required for belt manufacturing increases. In this invention, since the basis weight of the unidirectional fiber sheet is 50 g/m$^2$ or more, sufficient resistance to lateral pressure can be ensured by the reinforcing layer formed by one or a small number of unidirectional fiber sheets.

In the case where the basis weight of the unidirectional fiber sheet exceeds 400 g/m$^2$, the thickness of the reinforcing layer may be too thick even when the reinforcing layer is formed of one unidirectional fiber sheet, and the flexibility may decrease in some cases. In this invention, since the basis weight of the unidirectional fiber sheet is 400 g/m$^2$ or less, a decrease in flexibility can be prevented.

A method for manufacturing a power transmission V-belt according to a fourteenth aspect of the present invention is a method for manufacturing the power transmission V-belt in the first aspect, including: a laminating step of laminating one or plurally-laminated unidirectional fiber sheet(s) each having a structure in which the reinforcing fiber filaments are bonded to each other as the reinforcing layer on a first unvulcanized rubber layer that forms a part of the rubber layer, and thereon laminating a second unvulcanized rubber layer that forms another part of the rubber layer; and a vulcanizing step of vulcanizing the first unvulcanized rubber layer and the second unvulcanized rubber layer to form the rubber layer.

According to this method, a conventional method for manufacturing a power transmission V-belt in the related art can be used as it is, and it is possible to avoid complicating the manufacturing process. Furthermore, the reinforcing layer can be buried in an arbitrary position from an inner surface side to an outer surface side of the belt, and a place where the resistance to lateral pressure is desired to be particularly increased can be reinforced in a pinpoint manner.

A method for manufacturing a power transmission V-belt according to a fifteenth aspect is that, in the fourteenth aspect, before the laminating step, an adhesive component is attached to the unidirectional fiber sheet by at least one treatment of an RFL treatment, a rubber cement treatment and a resin impregnation treatment.

According to this method, an adhesive force between the reinforcing fiber filaments and a rubber composition is increased. Accordingly, peeling can be prevented from occurring between the reinforcing layer and the rubber layer, and life of the power transmission V-belt can be prolonged more.

Furthermore, since the reinforcing fiber filaments are more firmly bonded to each other by the adhesive component, orientations of the reinforcing fiber filaments can be prevented from being disturbed more reliably.

In the present invention, "the cross section, which is orthogonal to the belt circumferential direction, being a V shape" means that two side surfaces are disposed on two straight lines forming a V-shape in the cross section orthogonal to the belt circumferential direction. The cross section orthogonal to the belt circumferential direction of the power transmission V-belt of the present invention may be a quadrangle shape, a hexagonal shape or other shapes as long as it is the V shape. In this specification, "1 to 10" means being 1 or more and 10 or less. This definition is also applied to values other than 1 and 10.

BRIEF DESCRIPTION OF DRAWINGS

FIG. 1 is a cross-sectional view of a power transmission V-belt according to an embodiment of the present invention.

FIG. 2 is a cross-sectional perspective view of a belt body of the power transmission V-belt.

FIG. 3 is a cross-sectional view of a reinforcing layer.

FIG. 4 is a perspective view illustrating a manufacturing procedure of the power transmission V-belt.

FIG. 5 is a cross-sectional view of the power transmission V-belt during manufacturing.

FIGS. 6(a) and (b) of FIG. 6 are plan views of unidirectional fiber sheets according to modification examples.

FIG. 7 is a cross-sectional perspective view of a power transmission V-belt according to a modification example.

FIG. 8(a) of FIG. 8 is a cross-sectional view of a power transmission V-belt during manufacturing according to a modification example; and (b) of FIG. 8 is a cross-sectional view of the power transmission V-belt.

FIG. 9(a) of FIG. 9 is a cross-sectional view of a power transmission V-belt during manufacturing according to a modification example; and (b) of FIG. 9 is a cross-sectional view of the power transmission V-belt.

(a) of FIG. 10 is a cross-sectional view of a power transmission V-belt during manufacturing according to a modification example; and (b) of FIG. 10 is a cross-sectional view of the power transmission V-belt.

(a) of FIG. 11 is a cross-sectional view of a power transmission V-belt during manufacturing according to a modification example; and (b) of FIG. 11 is a cross-sectional view of the power transmission V-belt.

FIG. 12 is a cross-sectional perspective view of a power transmission V-belt according to a modification example.

FIG. 13 is a view illustrating a test for resistance to lateral pressure.

FIG. 14 is a view illustrating a test for flexibility.

DESCRIPTION OF EMBODIMENTS

Hereinafter, a power transmission V-belt 1 according to an embodiment of the present invention will be described. In the following description, a belt circumferential direction (belt longitudinal direction), a belt width direction, a belt thickness direction, a belt outer peripheral side, and a belt inner peripheral side are directions as indicated in FIG. 1. As illustrated in FIG. 1, the power transmission V-belt 1 has a shape of the cross section orthogonal to the belt circumferential direction being a V shape. The belt inner peripheral side is a narrow side, and the belt outer peripheral side is a wide side. The power transmission V-belt 1 is annular and is used by being wound around at least two pulleys 100 (a drive pulley and a driven pulley) each having a V-shaped groove 101 (hereinafter referred to as V-groove 101). The power transmission V-belt 1 has frictional power transmission surfaces 1a and 1b on both sides in the belt width direction. The frictional power transmission surfaces 1a and 1b are to be in contact with the V-groove 101 of the pulley 100. A frictional force caused by this contact transmits power between the power transmission V-belt 1 and the pulley 100.

The power transmission V-belt 1 is a wrapped V-belt, and includes a belt body 2 and a cover fabric 3 that covers an entire circumference of the belt body 2. The cover fabric 3 is, for example, a woven fabric woven with warp and weft formed of a synthetic fiber such as a polyester, polyamide, aramid, or vinylon, or a natural fiber such as cotton.

As illustrated in FIG. 2, the belt body 2 includes a rubber layer 4, a cord 5 buried in the rubber layer 4, and two reinforcing layers 6 buried in the rubber layer 4. The two reinforcing layers 6 are respectively buried on both sides of the cord 5 in the rubber layer 4. The rubber layer 4 includes an adhesion rubber layer 7 in which the cord 5 is buried, a compression rubber layer 8, and a tension rubber layer 9. The compression rubber layer 8 is provided on the belt inner peripheral side of the adhesion rubber layer 7. The compression rubber layer 8 is compressed in the belt circumferential direction when the power transmission V-belt 1 is made to run while being wound around the pulley 100. The tension rubber layer 9 is provided on the belt outer peripheral side of the adhesion rubber layer 7. The tension rubber layer 9 is stretched in the belt circumferential direction when the power transmission V-belt 1 is made to run while being wound around the pulley 100. The thickness of the compression rubber layer 8 is larger than the thickness of the tension rubber layer 9. The two reinforcing layers 6 are provided between the adhesion rubber layer 7 and the compression rubber layer 8 and between the adhesion rubber layer 7 and the tension rubber layer 9, respectively. That is, the two reinforcing layers 6 are buried in positions close to the cord 5 in the rubber layer 4, respectively.

The adhesion rubber layer 7, the compression rubber layer 8 and the tension rubber layer 9 are formed of rubber compositions. The rubber composition that forms the adhesion rubber layer 7 is different from the rubber composition that forms the compression rubber layer 8 and from the rubber composition that forms the tension rubber layer 9. The rubber composition that forms the adhesion rubber layer 7 has a higher adhesion to the cord 5 and the reinforcing layer 6 than the rubber composition that forms the compression rubber layer 8 and the rubber composition that forms the tension rubber layer 9. The rubber composition that forms the tension rubber layer 9 and the rubber composition that forms the compression rubber layer 8 may be the same as or different from each other.

As a rubber component of the rubber composition, a rubber capable of being vulcanized or cross-linked can be used. Specific examples thereof include diene rubbers (natural rubbers, isoprene rubbers, butadiene rubbers, chloroprene rubbers, styrene-butadiene rubbers, acrylonitrile-butadiene rubbers, hydrogenated nitrile rubbers, etc.), ethylene-α-olefin elastomers, chlorosulfonated polyethylene rubbers, alkylated chlorosulfonated polyethylene rubbers, epichlorohydrin rubbers, acrylic rubbers, silicone rubbers, urethane rubbers, fluororubbers, and the like. These rubber components may be used alone or in combination of two or more thereof. The compression rubber layer 8 and the adhesion rubber layer 7 preferably contain a chloroprene rubber.

The rubber composition may be blended with, as necessary, a vulcanizing agent or a cross-linking agent, a co-cross-linking agent, a vulcanization aid, a vulcanization accelerator, a vulcanization retarder, a metal oxide (zinc oxide, magnesium oxide, calcium oxide, barium oxide, iron oxide, copper oxide, titanium oxide, aluminum oxide, etc.), an enhancing agent (carbon black, silicon oxide such as hydrous silica, etc.), a short fiber, a filler (clay, calcium carbonate, talc, mica, etc.), a softener (an oil such as paraffin oil and naphthenic oil, etc.), a processing agent or processing aid (stearic acid, a metal salt of stearic acid, wax, paraffin, etc.), an anti-aging agent (an antioxidant, a thermal-aging inhibitor, a bending-crack inhibitor, an antiozonant, etc.), a colorant, a tackifier, a plasticizer, a coupling agent (a silane coupling agent, etc.), a stabilizer (an ultraviolet absorber, a thermal stabilizer, etc.), a flame retardant, an antistatic agent, and the like. The metal oxide may also be blended as a cross-linking agent.

The rubber composition that forms the compression rubber layer 8 may contain short fibers. A blending amount of the short fibers in the compression rubber layer 8 is preferably 0.1 to 10 parts by mass with respect to 100 parts by mass of the rubber component. The rubber composition that forms the tension rubber layer 9 may contain short fibers. The rubber composition that forms the adhesion rubber layer 7 does not contain short fibers.

The cord 5 extends in the belt circumferential direction and is buried at a constant interval in the belt width direction. The cord 5 is formed of a twisted cord (organzine, single twist, Lang's twist, etc.) using a multifilament yarn. A material of the cord 5 is, for example, a synthetic fiber such as an aramid fiber, or an inorganic fiber such as a carbon fiber. The cord 5 may be subjected to an adhesion treatment with an RFL liquid or the like for the purpose of enhancing adhesion thereof to the adhesion rubber layer 7.

The reinforcing layer 6 is formed of one unidirectional fiber sheet 10. The reinforcing layer 6 may be formed of a plurality of the unidirectional fiber sheets 10 laminated in the belt thickness direction. As illustrated in FIG. 3, the unidirectional fiber sheet 10 contains a large number of reinforcing fiber filaments 11 that are oriented in the belt width direction and spread in a sheet shape. For example, the fiber reinforcing filaments 11 in the unidirectional fiber sheet 10 may have a density of about $1 \times 10^9$ to $1 \times 10^{11}$ filaments/5 cm in the belt circumferential direction. Each of the reinforcing fiber filaments 11 has the same length as the belt width. The reinforcing fiber filaments 11 are arranged in a non-twisted state.

The reinforcing fiber filaments 11 are bonded to each other by a thermosetting resin 12. The thermosetting resin 12 is impregnated among the reinforcing fiber filaments 11. As for the thermosetting resin 12, for example, use can be made of an epoxy resin, a phenol resin, a melamine resin, a urea resin, a polyurethane resin, or the like, and the epoxy resin is particularly preferable. The reinforcing layer 6 does not contain fibers that intersect the belt width direction.

The thickness of the reinforcing layer 6 is 0.05 to 0.5 mm. In FIG. 1 and FIG. 2, the thickness of the reinforcing layer 6 is exaggerated. The thickness of the reinforcing layer 6 also contains the thickness of the thermosetting resin 12 that covers peripheries of the reinforcing fiber filaments 11. The unidirectional fiber sheet 10 has a basis weight, counting the thermosetting resin 12, being preferably 50 to 400 g/m². The thickness of the reinforcing fiber filaments 11 is not particularly limited, and is, for example, about 0.1 to 50 μm, and preferably about 5 to 25 μm. In the case where a fiber diameter is too small, handling is difficult, whereas in the case of too large, flexibility of the belt may be decreased. The reinforcing fiber filaments 11 preferably have a tensile modulus of elasticity (Young's modulus) of 200 to 600 GPa. The reinforcing fiber filaments 11 preferably has a thermal conductivity of 5.0 W/(m·K) or more. The upper limit of the thermal conductivity of the reinforcing fiber filaments 11 is not particularly limited, and may be about 20 W/(m·K).

The kind of fibers of the reinforcing fiber filaments 11 is not particularly limited, and examples thereof include carbon fibers, glass fibers, aramid fibers, polyamide fibers, polyester fibers, and the like. Among these fibers, carbon fibers are particularly preferable due to high tensile modulus of elasticity and high thermal conductivity. The reinforcing fiber filaments 11 constituting the unidirectional fiber sheet 10 may contain one kind or a plural kinds of fibers. Specific examples of the unidirectional fiber sheet 10 include "TORAYCA PREPREG" manufactured by Toray Industries, Inc. and "PYROFIL" manufactured by Mitsubishi Rayon Co., Ltd. Structures of the two reinforcing layers 6 may be the same as or different from each other.

The reinforcing layer 6 may have an adhesive component (not illustrated) attached thereto by an adhesion treatment for enhanced adhesion to the surrounding rubber layer 4 (adhesion rubber layer 7). Although the adhesion to the rubber layer 4 can be ensured by the thermosetting resin 12 that covers surfaces of the reinforcing fiber filaments 11 without performing the adhesion treatment, the adhesion treatment is preferably performed in order to further enhance the adhesion. Examples of the adhesion treatment include an RFL treatment and a rubber cement treatment (soaking treatment). The RFL treatment is a treatment in which the unidirectional fiber sheet 10 or the reinforcing fiber filaments 11 before forming the unidirectional fiber sheet 10 is immersed in an RFL liquid and is then subjected to a heat treatment, so as to adhere an adhesive component to the unidirectional fiber sheet 10 or the reinforcing fiber filaments 11 before forming the unidirectional fiber sheet 10. The RFL liquid is obtained by mixing an initial condensate of resorcin and formalin with a latex, and for the latex, use can be made of a styrene-butadiene vinylpyridine terpolymer, hydrogenated nitrile rubber, chlorosulfonated polyethylene, epichlorohydrin, and the like. The rubber cement treatment is a treatment in which an unvulcanized rubber composition is dissolved in a solvent to form a rubber cement, which is then coated on a surface of the unidirectional fiber sheet 10, and the solvent is evaporated so as to form a film (adhesive component) of the unvulcanized rubber composition on the surface of the unidirectional fiber sheet 10. The rubber cement treatment may be performed after the adhesion treatment using the RFL liquid.

Next, a manufacturing procedure of the power transmission V-belt 1 will be described with reference to FIG. 4 and FIG. 5.

First, as illustrated in FIG. 4, an unvulcanized rubber sheet 118 that forms the compression rubber layer 8 is wound around a cylindrical molding drum M. Then, the unidirectional fiber sheet 10 is wound thereon such that orientations of the reinforcing fiber filaments 11 are substantially parallel to a central axis direction of the molding drum M. The width of the unidirectional fiber sheet 10 to be wound (length in the central axis direction of the molding drum M) is substantially the same as the width of the unvulcanized rubber sheet 118. The reinforcing fiber filaments 11 of the unidirectional fiber sheet 10 are impregnated with a semi-hardened thermosetting resin 12. The unidirectional fiber sheet 10 may have been subjected to an adhesive treatment such as an RFL treatment or a rubber cement treatment. In the case where the reinforcing layer 6 is composed of a plurality of unidirectional fiber sheets 10, either of the following two methods may be adopted. The first method is a method in which the plurality of unidirectional fiber sheets 10, which have the same width as the rubber sheet 118 and substantially the same length as a belt circumferential length, are wound one by one. The second method is a method in which a long unidirectional fiber sheet 10, which has the same width as the rubber sheet 118 and a length of a plurality of times the belt circumferential length, is wound a plurality of turns.

Subsequently, an unvulcanized rubber sheet 117A (see FIG. 5) that forms a part of the adhesion rubber layer 7 is wound thereon. Then, one cord 5 is spirally wound thereon. Alternatively, a plurality of cords 5 are wound at a predetermined interval. Next, an unvulcanized rubber sheet 117B (see FIG. 5) that forms a remaining part of the adhesion rubber layer 7 is wound thereon, and the unidirectional fiber sheet 10 is wound in the same manner as described above. Thereafter, an unvulcanized rubber sheet 119 (see FIG. 5) that forms the tension rubber layer 9 is wound thereon to form an unvulcanized belt sleeve. During vulcanization, the thermosetting resin 12 impregnated in the reinforcing fiber filaments 11 is completely hardened.

Next, the unvulcanized belt sleeve is cut into a predetermined width and is cut to have a V-shaped cross section, to be processed into the belt body 2 in an unvulcanized state. Thereafter, the belt body 2 is covered with the cover fabric 3 that has been subjected to a friction treatment, so as to form an unvulcanized belt. Then, the unvulcanized belt is fitted into a molding die to be heated and pressurized to perform vulcanization (or cross-linking). Accordingly, the power transmission V-belt 1 is formed. The friction treatment is a treatment using a calendar roll in which the unvulcanized rubber composition and the cover fabric 3 are made to simultaneously pass through rolls rotating at different surface speeds from each other, to thereby rub the unvulcanized rubber composition among fibers of the cover fabric 3.

In the above manufacturing procedure, constituent elements are sequentially wound around the molding drum M in the order from the inner peripheral side of the power transmission V-belt 1, and constituent elements may also be sequentially wound around the molding die in the order from the outer peripheral side of the power transmission V-belt 1.

The power transmission V-belt 1 according to the present embodiment can achieve the following effects.

In the power transmission V-belt 1 according to the present embodiment, a large number of reinforcing fiber filaments 11 are buried in the rubber layer 4 as the reinforcing layer 6 in a state of being spread in a sheet shape while being oriented in the belt width direction. Therefore, resistance to lateral pressure of the power transmission V-belt 1 can be improved as compared with the case where the reinforcing layer 6 is not provided or the case where short fibers oriented in the belt width direction are buried in the rubber layer 4 in a dispersed manner. Furthermore, orientations of the reinforcing fiber filaments 11 can be prevented from being disturbed since the large number of reinforcing fiber filaments 11 constituting the reinforcing layer 6 are spread and bonded in a sheet shape. Accordingly, the resistance to lateral pressure can be improved more reliably. Since the resistance to lateral pressure is improved, life of the power transmission V-belt 1 can be prolonged.

The reinforcing layer 6 does not contain fibers that intersect in the belt width direction at all. Therefore, substantially the same flexibility as in the case where the reinforcing layer 6 is not provided can be ensured. That is, it is possible to prevent a decrease in the flexibility of the power transmission V-belt 1. Furthermore, the thickness of the reinforcing layer 6 can be reduced while ensuring a high resistance to lateral pressure by burying the reinforcing fiber filaments 11 in a non-twisted state. Accordingly, it is possible to further prevent a decrease in flexibility.

Since the reinforcing fiber filaments 11 are buried in a non-twisted state, heat generation due to friction between fibers hardly occurs during bending. Furthermore, by preventing the decrease in flexibility, it is possible to prevent heat generation of the belt due to bending when the belt is wound around or separated from the pulley. Therefore, it is possible to prevent an increase in belt temperature during running By preventing the increase in belt temperature, it is possible to further prolong the life of the power transmission V-belt 1.

The thickness of the reinforcing layer 6 is 0.05 to 0.5 mm, preferably 0.05 to 0.3 mm, and more preferably 0.05 to 0.2 mm (particularly 0.08 to 0.15 mm). In the case where the thickness of the reinforcing layer 6 exceeds 0.5 mm, flexibility may decrease, and heat generation of the belt due to bending may increase in some cases. By setting the thickness of the reinforcing layer 6 to be 0.5 mm or small, a decrease in flexibility and heat generation of the belt can be reliably prevented. In the case where the thickness of the reinforcing layer 6 is less than 0.05 mm, sufficient resistance to lateral pressure may not be ensured in some cases. In the present embodiment, the non-twisted reinforcing fiber filaments 11 have a good effect in improving the resistance to lateral pressure. Therefore, sufficient resistance to lateral pressure can be ensured even if the reinforcing layer 6 is as thin as 0.05 to 0.5 mm.

Since the reinforcing fiber filaments 11 are spread and bonded in a sheet shape and are not loosened, handling of the reinforcing layer 6 is easy during belt manufacturing. Specifically, it is possible to easily perform an operation of winding the unidirectional fiber sheet 10 that forms the reinforcing layer 6 on unvulcanized rubber, and an operation of applying an adhesive treatment such as an RFL treatment or a rubber cement treatment to the reinforcing layer 6 (unidirectional fiber sheet 10).

In the case where the tensile modulus of elasticity of the reinforcing fiber filaments 11 is less than 200 GPa, sufficient resistance to lateral pressure may not be ensured in some cases. The tensile modulus of elasticity of the reinforcing fiber filaments 11 is preferably 200 GPa or more. This makes it possible to ensure sufficient resistance to lateral pressure while reducing the thickness of the reinforcing layer 6 and preventing a decrease in flexibility.

In the case where the tensile modulus of elasticity of the reinforcing fiber filaments 11 exceeds 600 GPa, the reinforcing fiber filaments 11 are less likely to follow a deformation of the belt. As a result, peeling is likely to occur between the reinforcing layer 6 and the rubber composition, which lead to a shortening of the belt life. The tensile modulus of elasticity of the reinforcing fiber filaments 11 is preferably 600 GPa or less, which makes it possible to prevent the peeling from occurring between the reinforcing layer 6 and the rubber composition and to prolong the belt life more.

The reinforcing fiber filaments 11 preferably have a thermal conductivity of 5.0 W/(m·K) or more. Accordingly, heat generated in the belt due to bending or friction can be efficiently diffused into air or the pulley through the reinforcing fiber filaments 11 having a high thermal conductivity. Therefore, an increase in belt temperature can be prevented, and the life of the power transmission V-belt 1 can be further prolonged.

The reinforcing fiber filaments 11 are preferably carbon fibers. Accordingly, the tensile modulus of elasticity of the reinforcing fiber filaments 11 can be 200 to 600 GPa. In addition, the thermal conductivity of the reinforcing fiber filaments 11 can be 5.0 W/(m·K) or more.

In the present embodiment, resistance to lateral pressure can be further improved since the reinforcing layer 6 is provided on each side (belt outer peripheral side and belt inner peripheral side) of the cord 5. Therefore, the life can be prolonged even if the power transmission V-belt 1 is used under high load conditions.

In the present embodiment, the reinforcing layer 6 is in contact with the adhesion rubber layer 7 in which the cord 5 is buried. That is, the reinforcing layer 6 is buried in a position close to the cord 5. The power transmission V-belt 1 is required to have higher resistance to lateral pressure as approaching the cord 5 in the belt thickness direction. Therefore, since the reinforcing layer 6 is buried in a position close to the cord 5, sufficient resistance to lateral pressure can be ensured by a relatively thin reinforcing layer 6. Since the thickness of the reinforcing layer 6 is small, a decrease in flexibility is further prevented.

In the case where the reinforcing layer 6 is buried in the compression rubber layer 8 (or in the tension rubber layer 9), it is necessary to dispose the reinforcing layer 6 between two rubber sheets that form the compression rubber layer 8 (or the tension rubber layer 9) during manufacturing. In the present embodiment, the reinforcing layer 6 is buried between the compression rubber layer 8 and the adhesion rubber layer 7 and between the tension rubber layer 9 and the adhesion rubber layer 7. Accordingly, the number of steps required for belt manufacturing can be reduced as compared with the case where the reinforcing layer 6 is buried in the compression rubber layer 8 or in the tension rubber layer 9.

In the case where the blending amount of short fibers blended in the compression rubber layer 8 exceeds 10 parts by mass with respect to 100 parts by mass of the rubber component, flexibility is reduced and adhesiveness between the compression rubber layer 8 and an adjacent layer decreases. Accordingly, cracks are likely to occur in the rubber. The blending amount of short fibers blended in the compression rubber layer 8 is preferably 10 parts by mass or less with respect to 100 parts by mass of the rubber component. Accordingly, a decrease in flexibility and adhesiveness can be minimized, and cracks can be prevented from occurring. Therefore, life of the power transmission V-belt 1 can be further prolonged.

In the case where the blending amount of short fibers blended in the compression rubber layer 8 is less than 0.1 parts by mass with respect to 100 parts by mass of the rubber component, resistance to lateral pressure may be insufficient and the belt life may be shortened in some cases. The blending amount of short fibers blended in the compression rubber layer 8 is preferably 0.1 to 10 parts by mass, and is particularly preferably 0.1 to 5 parts by mass or less with respect to 100 parts by mass of the rubber component. Since the reinforcing layer 6 has a good effect in improving the resistance to lateral pressure, sufficient resistance to lateral pressure can be ensured even if the blending amount of short fibers blended in the compression rubber layer 8 is as small amount as 0.1 to 10 parts by mass with respect to 100 parts by mass of the rubber component.

The compression rubber layer 8 and the adhesion rubber layer 7 preferably contain chloroprene rubber. In the case where the compression rubber layer 8 and the adhesion rubber layer 7 contain chloroprene rubber, which has good balance of various properties such as heat resistance, abrasion resistance and weather resistance, durability of the power transmission V-belt 1 can be improved. Furthermore, an adhesive force between the reinforcing layer 6 and the compression rubber layer 8 and an adhesive force between the reinforcing layer 6 and the adhesion rubber layer 7 are improved, and peeling between these layers can be prevented. Accordingly, life of the power transmission V-belt 1 can be more prolonged. Furthermore, the chloroprene rubber is relatively inexpensive, resulting in a good economic efficiency.

The reinforcing layer 6 is formed of one or a plurally-laminated unidirectional fiber sheet(s) 10. The unidirectional fiber sheet 10 has a structure in which the reinforcing fiber filaments 11 are bonded to each other by a thermosetting resin. Therefore, adhesiveness between the reinforcing fiber filaments 11 and the rubber composition is improved by the thermosetting resin. Accordingly, life of the power transmission V-belt 1 can be more prolonged.

When the unidirectional fiber sheets 10 have the same structure, the resistance to lateral pressure can be improved more as the number of unidirectional fiber sheets 10 constituting the reinforcing layer 6 becomes large. When the unidirectional fiber sheet 10 have the same structure, a decrease in flexibility can be prevented more as the number of unidirectional fiber sheets 10 constituting the reinforcing layer 6 becomes small.

In the case where the basis weight of the unidirectional fiber sheets 10 is less than 50 g/m², the number of unidirectional fiber sheets 10 constituting the reinforcing layer 6 necessary to ensure sufficient resistance to lateral pressure increases, and the number of steps required for belt manufacturing increases. The basis weight of the unidirectional fiber sheet 10 is preferably 50 g/m² or more. Accordingly, sufficient resistance to lateral pressure can be ensured by the reinforcing layer 6 formed by one or a small number of unidirectional fiber sheets 10.

In the case where the basis weight of the unidirectional fiber sheets 10 exceeds 400 g/m², the thickness of the reinforcing layer 6 may be too thick even when the reinforcing layer 6 is formed of one unidirectional fiber sheet 10, and the flexibility may decrease in some cases. The basis weight of the unidirectional fiber sheets 10 is preferably 400 g/m² or less, and more preferably 200 g/m² or less (particularly 100 g/m² or less). Accordingly, a decrease in flexibility can be prevented.

A method for manufacturing the power transmission V-belt 1 includes: a laminating step of laminating one or plurally-laminated unidirectional fiber sheet(s) 10 each having a structure in which the reinforcing fiber filaments 11 are bonded to each other as one reinforcing layer 6 on the unvulcanized rubber sheet 118 that forms a part of the rubber layer 4, and thereon laminating unvulcanized rubber sheets 117A, 117B and 119 that form the other part of the rubber layer 4; and a vulcanizing step of vulcanizing the unvulcanized rubber sheets 118, 117A, 117B, 119 to form the rubber layer 4.

According to this method, a conventional method for manufacturing a power transmission V-belt in the related art can be used as it is, and it is possible to avoid complicating the manufacturing process. Furthermore, the reinforcing layer 6 can be buried in an arbitrary position from an inner surface side to an outer surface side of the belt, and a place where the resistance to lateral pressure is desired to be particularly increased can be reinforced in a pinpoint manner.

It is preferable that an adhesive component is attached to the unidirectional fiber sheets 10 by the RFL treatment or the rubber cement treatment before the laminating step.

According to this method, an adhesive force between the reinforcing fiber filaments 11 and the rubber composition is increased. Accordingly, peeling can be prevented from occurring between the reinforcing layer 6 and the rubber layer 4, and life of the power transmission V-belt 1 can be prolonged more.

Furthermore, since the reinforcing fiber filaments 11 are more firmly bonded to each other by the adhesive component, orientations of the reinforcing fiber filaments 11 can be prevented from being disturbed more reliably.

Although a preferred embodiment of the present invention has been described above, the present invention is not limited to the embodiment described above, and various modifications can be made within the disclosures of the scope of the claims.

Modification examples of the present invention will be described below. The above-described embodiment and the following modification examples may be combined as appropriate to practice.

Modification Example 1

The unidirectional fiber sheet 10 in the above embodiment has a structure in which the reinforcing fiber filaments 11 are bonded to each other by a thermosetting resin. However, the unidirectional fiber sheet in the present invention may have a structure in which the reinforcing fiber filaments are bonded to each other by means other than the thermosetting resin.

For example, in the unidirectional fiber sheet, the reinforcing fiber filaments along the belt width direction are bonded to each other by auxiliary yarns that intersect with the belt width direction and have a weight per unit area being 30% or less of that of the reinforcing fiber filaments. Specifically, for example, as in an unidirectional fiber sheet 210 illustrated in (a) of FIG. 6, fiber bundles 213 composed of a plurality of reinforcing fiber filaments and auxiliary yarns 214 may intersect with each other in a plain weave pattern. Alternatively, for example, as illustrated in (b) of FIG. 6, an unidirectional fiber sheet 310 may be woven by fiber bundles 313 composed of a plurality of reinforcing fiber filaments and auxiliary yarns 314.

The auxiliary yarn may extend along a belt circumferential direction as auxiliary yarns 214, 314 illustrated in (a) of FIG. 6 and (b) of FIG. 6, and may also be inclined with respect to the belt circumferential direction and the belt width direction. The auxiliary yarn preferably has a smaller fineness than the fineness of the fiber bundle of reinforcing fiber filaments. The kind of fiber of the auxiliary yarn is not particularly limited, and may be the same as or different from the kind of fiber of the reinforcing fiber filaments. The auxiliary yarn may be a twisted yarn or a non-twisted yarn.

The weight per unit area of the auxiliary yarn in the reinforcing layer is 30% or less of the weight per unit area of the reinforcing fiber filaments contained in the reinforcing layer. Therefore, a decrease in flexibility can be prevented similarly to the above-described embodiment. From a viewpoint of preventing a decrease in flexibility, the weight per unit area of the auxiliary yarn is preferably 20% or less and more preferably 10% or less of the weight per unit area of the reinforcing fiber filaments. The lower limit of the weight per unit area of the auxiliary yarn is not particularly limited, and may be about 0.1% of the weight per unit area of the reinforcing fiber filaments.

In the case where the reinforcing fiber filaments are bonded to each other by a resin as in the above-described embodiment, flexibility of the belt may decrease depending on the kind of the resin and the thickness in some cases. In the case where the reinforcing fiber filaments are bonded by the auxiliary yarn, a decrease in flexibility is prone to be prevented. Furthermore, when a strong force is applied to the unidirectional fiber sheet in a belt circumferential length direction during an adhesive treatment, molding or the like, the unidirectional fiber sheet hardly tear as compared with the case where the reinforcing fiber filaments are bonded by a resin.

In the case where the reinforcing fiber filaments are bonded to each other by means other than a thermosetting resin, preferable ranges of the thickness of the reinforcing layer, basis weight of the unidirectional fiber sheet and characteristics (thickness, tensile modulus of elasticity, and thermal conductivity) of the reinforcing fiber filaments, as well as specific examples of the material of the reinforcing fiber filaments are the same as those in the above-described embodiment. The basis weight of the unidirectional fiber sheet in which the reinforcing fiber filaments are bonded to each other by means other than a thermosetting resin is a basis weight counting means (e.g., an auxiliary yarn) that bonds the reinforcing fiber filaments together. Specific examples of the unidirectional fiber sheet in which the reinforcing fiber filaments are bonded to each other by means other than a thermosetting resin include a "FIBRA Sheet" manufactured by Fibex Co., Ltd. The unidirectional fiber sheet in which the reinforcing fiber filaments are bonded to each other by means other than a thermosetting resin may form a reinforcing layer only by one sheet, and may form a reinforcing layer in a state in which a plurality of sheets are laminated.

In the case where the reinforcing fiber filaments are bonded to each other by the auxiliary yarn, the unidirectional fiber sheet (reinforcing layer) is preferably subjected to an adhesive treatment such as an RFL treatment, a rubber cement treatment and a resin impregnation treatment. The resin impregnation treatment is a treatment in which the unidirectional fiber sheet is impregnated in a resin solution such as an isocyanate solution and an epoxy solution. The RFL treatment or the rubber cement treatment may be performed after the resin impregnation treatment. The adhesion treatment can enhance adhesion to the rubber layer.

Modification Example 2

Two reinforcing layers 6 are provided in the above-described embodiment, but the number of reinforcing layer provided in the power transmission V-belt of the present invention may be one or three or more. In the case where there is only one reinforcing layer, it may be buried either in a belt inner peripheral side or in a belt outer peripheral side of the cord. In the case where there are a plurality of reinforcing layers, two or more reinforcing layers may be buried in the inner peripheral side of the cord. Also, in the case where there are a plurality of reinforcing layers, two or more reinforcing layers may be buried in the outer peripheral side of the cord.

Modification Example 3

The reinforcing layer 6 is buried between the compression rubber layer 8 and the adhesion rubber layer 7 in the above-described embodiment. However, for example, as illustrated in FIG. 7, a reinforcing layer 406 may be buried in a compression rubber layer 408. The reinforcing layer 406 is composed of three laminated unidirectional fiber sheets 10. In addition, although the reinforcing layer 6 is buried between the tension rubber layer 9 and the adhesion rubber layer 7 in the above-described embodiment, the reinforcing layer may be buried in the tension rubber layer. Although the reinforcing layer is preferably buried in a vicinity of the cord from a viewpoint of improving resistance to lateral pressure, the reinforcing layer may be buried away from the cord. For example, as illustrated in FIG. 7, the reinforcing layer 406 may be buried at a substantial center of the compression rubber layer 408 in a belt thickness direction. Also, for example, the reinforcing layer may be buried at a more belt inner peripheral side than the substantial center of the compression rubber layer in the belt thickness direction. By burying the reinforcing layer in the compression rubber layer or in the tension rubber layer, buckling deformation due to dishing becomes small, and heat generation of the belt and peeling between constituent members can be prevented from occurring. Therefore, life of the power transmission V-belt can be further prolonged. In the case where the reinforcing layer is buried at the center of the compression rubber layer in the belt thickness direction or at the more belt inner peripheral side than the center, the amount of rubber compressed during buckling deformation increases, an elastic repulsive force increases, and the buckling deformation can be prevented.

Modification Example 4

In the present invention, in the case where the rubber layer is composed of an adhesion rubber layer, a compression rubber layer and a tension rubber layer, a cord may be only partially buried in the adhesion rubber layer.

For example, as in a power transmission V-belt 501 illustrated in (b) of FIG. 8, the cord 5 may be buried between an adhesion rubber layer 507 and a tension rubber layer 509. In (b) of FIG. 8, the reinforcing layer 6 is buried between the compression rubber layer 8 and the adhesion rubber layer 507. The reinforcing layer 6 may be buried anywhere other than between the adhesion rubber layer 507 and the tension rubber layer 509. (a) of FIG. 8 illustrates a state in which constituent elements of a belt body are wound around the molding drum M in a manufacturing process of the power transmission V-belt 501. The cord 5 is disposed between an unvulcanized rubber sheet 519 that forms the tension rubber layer 509 and an unvulcanized rubber sheet 517 that forms the adhesion rubber layer 507.

Although not illustrated, the cord may be buried between the adhesion rubber layer and the compression rubber layer. In this case, the reinforcing layer may be buried anywhere other than between the adhesion rubber layer and the compression rubber layer.

Modification Example 5

In the present invention, the rubber layer may not have an adhesion rubber layer. The rubber layer may be composed only of a compression rubber layer and a tension rubber layer formed of a rubber composition different from that of the compression rubber layer. In this modification example, a cord is not buried in the adhesion rubber layer.

For example, as in a power transmission V-belt 601 illustrated in (b) of FIG. 9, the cord 5 may be buried between a compression rubber layer 608 and a tension rubber layer 609. In (b) of FIG. 9, two reinforcing layers 6 are buried in the compression rubber layer 608 and the tension rubber layer 609, respectively. (a) of FIG. 9 illustrates a state in which constituent elements of a belt body are wound around the molding drum M in a manufacturing process of the power transmission V-belt 601. One of the two reinforcing layers 6 is disposed between two unvulcanized rubber sheets 618A and 618B that form the compression rubber layer 608. The other reinforcing layer 6 is disposed between two unvulcanized rubber sheets 619A and 619B that form the tension rubber layer 609.

Alternatively, for example, as in a power transmission V-belt 701 illustrated in (b) of FIG. 10, the cord 5 may be buried in a compression rubber layer 708. In (b) of FIG. 10, two reinforcing layers 6 are buried in the compression rubber layer 708 and between the compression rubber layer 708 and the tension rubber layer 9, respectively. The reinforcing layer may be buried in the tension rubber layer 9 or in the compression rubber layer 708. (a) of FIG. 10 illustrates a state in which constituent elements of a belt body are wound around the molding drum M in a manufacturing process of the power transmission V-belt 701. The compression rubber layer 708 is formed by three unvulcanized rubber sheets 718A, 718B and 718C.

Although not illustrated, the cord may be buried in the tension rubber layer. In this case, the reinforcing layer may be buried in the tension rubber layer, in the compression rubber layer, and between the compression rubber layer and the tension rubber layer.

In the case where the adhesion rubber layer is not provided, the number of steps required for manufacturing the belt can be reduced.

Modification Example 6

In the case where an adhesion rubber layer is not provided and a reinforcing layer is buried in a vicinity of a cord, when the reinforcing layer is subjected to an adhesive treatment such as an RFL treatment, a resin impregnation treatment or a rubber cement treatment in a manufacturing process, a rubber sheet may not be interposed between the reinforcing layer and the cord. A power transmission V-belt illustrated in (b) of FIG. 11 is such an example. As illustrated in (a) of FIG. 11 and (b) of FIG. 11, the belt body of a power transmission V-belt 801 is formed by winding an unvulcanized rubber sheet 818 that forms the compression rubber layer 8, the reinforcing layer 6, the cord 5, and an unvulcanized rubber sheet 819 that forms a tension rubber layer 809 in this order on the molding drum M.

Modification Example 7

The power transmission V-belt of the present invention may be a raw edge V-belt in which a frictional power transmission surface is not covered with a cover fabric. The cover fabric may be not provided at all, and the cover fabric may be provided only on at least one of an outer peripheral surface and an inner peripheral surface.

Modification Example 8

The power transmission V-belt of the present invention may be a cogged belt having a plurality of cogs arranged in a belt circumferential direction on at least one of a belt inner peripheral surface and a belt outer peripheral surface. FIG. 12 illustrates such an example. A belt body 902 of a cogged belt (power transmission V-belt) 901 in FIG. 12 has cogs 902a only on an inner peripheral surface. In FIG. 12, a reinforcing layer 906 is buried in a compression rubber layer 908. In the case where the reinforcing layer is buried in a vicinity of a cord in the cogged belt, the reinforcing layer may be buried along the cord without following the concavity and convexity of cogs. On the other hand, in the case where the reinforcing layer is buried in a position close to the cogs in the cogged belt, for example, as illustrated in FIG. 12, the reinforcing layer 906 may be disposed along the concavity and convexity of the cogs 902a. Similarly to a general cogged belt, formation of cogs can be performed by fitting an unvulcanized belt sleeve or an unvulcanized belt main body to a mold matrix (metal mold or rubber mold) on which concavity and convexity are formed.

EXAMPLES

Power transmission V-belts of Examples and Comparative Examples of the present invention were tested to demonstrate effects of the present invention. Structures of the power transmission V-belts of Examples 1 to 7 and Comparative Examples 1 to 4 are shown in Table 1. The power transmission V-belts of Examples 1 to 6 and Comparative Examples 1 to 4 were wrapped V-belts having a belt type defined in JIS K6323(2008) of "B", a nominal number of 60, and a circumferential length of 1,524 mm. The power transmission V-belt of Example 7 was a raw edge V-belt having a belt type defined in JIS K6323(2008) of B, a nominal number of 60, and a circumferential length of 1,524 mm. That is, a frictional power transmission surface of the power transmission V-belt of Example 7 is not covered with a cover fabric.

TABLE 1

|  |  | Ex. 1 | Ex. 2 | Ex. 3 | Ex. 4 | Ex. 5 | Ex. 6 |
|---|---|---|---|---|---|---|---|
|  | Belt Type | colspan: Wrapped | | | | | |
| Reinforcing Layer | Fiber Type | colspan: Carbon fibers | | | | | |
|  | Twist | colspan: Non-Twisted | | | | | |
|  | Bond | colspan: Bonded by thermosetting resin | | | | | |
|  | Burying Number | 2 | 1 | 2 | 2 | 2 | 3 |
|  | Burying Position | Upper side of cord, Lower side of cord | Lower side of cord, | Upper side of cord, Lower side of cord | Upper side of cord, Lower side of cord | Upper side of cord, In compression rubber | Upper side of cord, Lower side of cord, In compression rubber |
|  | Basic Weight | 50 g/m² | 50 g/m² | 100 g/m² | 50 g/m² | 50 g/m² | 50 g/m² |
|  | Laminating Number | 1 | 1 | 1 | 2 | 1 | 1 |
|  | Thickness | 0.1 mm | 0.1 mm | 0.2 mm | 0.2 mm | 0.1 mm | 0.1 mm |
| Tension Rubber Layer |  | colspan: Rubber composition A | | | | | |
| Compression Rubber Layer |  | colspan: Rubber composition A | | | | | |
| Adhesion Rubber Layer |  | colspan: Rubber composition B | | | | | |
| Cord |  | colspan: Aramid cord | | | | | |
| Cover Fabric |  | colspan: Cotton + PET fibers | | | | | |

|  |  | Ex. 7 | Comp. Ex. 1 | Comp. Ex. 2 | Comp. Ex. 3 | Comp. Ex. 4 |
|---|---|---|---|---|---|---|
|  | Belt Type | Raw edge | — | colspan: Wrapped | | — |
| Reinforcing Layer | Fiber Type | Carbon fibers | — | Aramid fibers | PET fibers | — |
|  | Twist | Non-Twisted | — | colspan: Twisted | | — |
|  | Bond | Bonded by thermosetting resin | — | colspan: Bonded by fine yarns (blinds-like cords) | | — |
|  | Burying Number | 2 | — | 2 | 2 | — |
|  | Burying Position | Upper side of cord, Lower side of cord | — | Upper side of cord, Lower side of cord | Upper side of cord, Lower side of cord | — |
|  | Basic Weight | 50 g/m² | — | — | — | — |
|  | Laminating Number | 1 | — | 1 | 1 | — |
|  | Thickness | 0.1 mm | — | 0.7 mm | 0.6 mm | — |
| Tension Rubber Layer |  | colspan: Rubber composition A | | | | Rubber composition C |
| Compression Rubber Layer |  | colspan: Rubber composition A | | | | Rubber composition C |
| Adhesion Rubber Layer |  | colspan: Rubber composition B | | | | |
| Cord |  | colspan: Aramid cord | | | | |
| Cover Fabric |  | — | colspan: Cotton + PET fibers | | | |

Among burying positions of reinforcing layers in Table 1, "Upper side of cord" refers to a state in which a reinforcing layer is buried between an adhesion rubber layer and a tension rubber layer. "Lower side of cord" refers to a state in which a reinforcing layer is buried between an adhesion rubber layer and a compression rubber layer. "In compression rubber" refers to a state in which a reinforcing layer is buried in a compression rubber layer.

Reinforcing layers in Examples 1 to 3 and 5 to 7 were each composed of one unidirectional fiber sheet. As for the unidirectional fiber sheets in Examples 1 to 3 and 5 to 7, unidirectional carbon fiber sheet in which carbon fiber filaments oriented in one direction were bonded by a thermosetting resin was used. The basis weight of the unidirectional fiber sheet in Example 3 was set twice (100 g/m²) the basis weight of the unidirectional fiber sheets in Examples 1, 2, and 5 to 7. The reinforcing layer in Example 4 was formed of two laminated unidirectional fiber sheets. The unidirectional fiber sheets used in Example 4 were the same as the unidirectional fiber sheets in Examples 1, 2, and 5 to 7. The thicknesses of the reinforcing layers in Examples 1, 2, and 5 to 7 were 0.1 mm, and the thicknesses of the reinforcing layers in Examples 3 and 4 were 0.2 mm. The unidirectional fiber sheets in Examples 1 to 7 were subjected to an RFL treatment.

No reinforcing layer was buried in the power transmission V-belts of Comparative Examples 1 and 4. In the power transmission V-belts of Comparative Examples 2 and 3, one sheet of blinds-like cords was used as a reinforcing layer. The blinds-like cords in Comparative Example 2 had a configuration where a twisted cords (1670 dtex/1×2) of aramid fibers oriented in one direction were connected with each other by fine cotton yarns (count of yarn: 20S/1). The density of the twisted cords of the aramid fibers was set 50 cords/5 cm, and the density of fine yarns was set 4 yarns/5 cm. The thickness (thickness of blinds-like cords) of the reinforcing layer in Comparative Example 2 was 0.7 mm. The blinds-like cords in Comparative Example 3 had a configuration where a twisted cords (1,100 dtex/1×2) of PET fibers oriented in one direction were connected with each other by fine cotton yarns (count of yarn: 20S/1). In both Comparative Examples 2 and 3, the density of the twisted cords was set 50 cords/5 cm, and the density of fine yarns was set 4 yarns/5 cm. The thickness (thickness of blinds-like cords) of the reinforcing layer in Comparative Example 3 was 0.6 mm. In both Comparative Examples 2 and 3, the blinds-like cords were subjected to an RFL treatment. In both Comparative Examples 2 and 3, the blinds-like cords were disposed such that the twisted cord was oriented in a belt width direction.

As shown in Table 1, the structures of the tension rubber layer and the compression rubber layer in Examples 1 to 7 and Comparative Examples 1 to 3 were all the same. The tension rubber layer and the compression rubber layer in Comparative Example 4 were configured to contain more short fibers than that in the tension rubber layer and the compression rubber layer in Example 1 and the like. The structures of the adhesion rubber layer and the cord in Examples 1 to 7 and Comparative Examples 1 to 4 were all the same. An aramid cord, which had a total fineness of 4,400 dtex obtained by performing a primary twisting (S-twisting) on filaments of aramid fibers having a fineness of 1,100 dtex and aligning four sets of the resultant and performing a secondary twisting (Z-twisting) thereon, was used as the cord. A woven fabric, which was obtained by a plain weave of combined-twisted yarns of cotton and polyethylene terephthalate (PET) fibers, was used as a cover fabric in Examples 1 to 6 and Comparative Examples 1 to 4. Compositions of the rubber composition A and the rubber composition B in Table 1 are as shown in Table 2.

Anti-aging agent: "NONFLEX OD3" manufactured by Seiko Chemical Co., Ltd.

Vulcanization accelerator DM: di-2-benzothiazolyl disulfide

Vulcanization accelerator TMTD: tetramethylthiuram disulfide

[Test for Resistance to Lateral Pressure]

Test for resistance to lateral pressure was performed by using the power transmission V-belts of Examples 1 to 7 and Comparative Examples 1 to 4. First, a power transmission V-belt was cut to prepare a sample S for evaluation of resistance to lateral pressure, having a length of 70 mm in a belt circumferential direction. Then, as illustrated in FIG. 13, the sample S was sandwiched in an upper-lower direction by two metal jigs 51 and 52 so that a frictional power transmission surface of the sample S for evaluation of resistance to lateral pressure was in contact with the jigs 51 and 52. The position of the upper jig 51 in a state in which the sample S is sandwiched by the two jigs without being pressed is referred to as an initial position. The upper jig 51 was lowered at a speed of 5 mm/min by using an autograph ("AGS-J10kN" manufactured by Shimadzu Corporation), and the compressive force when the distance moved from the initial position of the upper jig 51 was 1.4 mm was measured. The resistance to lateral pressure can be determined to be high as the measured compressive force becomes large. Measurement results are shown in Table 3.

[Test for Flexibility]

Test for flexibility was performed by using the power transmission V-belts of Examples 1 to 7 and Comparative Examples 1 to 4. As illustrated in FIG. 14, a power transmission V-belt B was disposed between two metal plates 61 and 62 arranged up and down at an interval of 180 mm. The position of the upper metal plate 61 at this time is referred

TABLE 2

|  | Rubber Composition A | Rubber Composition B | Rubber Composition C |
| --- | --- | --- | --- |
| Chloroprene Rubber | 100 | 100 | 100 |
| Polyamide Short Fibers | 5 | — | 30 |
| Carbon Black | 20 | 30 | 20 |
| Silica | — | 25 | — |
| Naphthenic Oil | 5 | 5 | 5 |
| Magnesium Oxide | 4 | 4 | 4 |
| Resorcin-Formaldehyde Condensate | — | 1 | — |
| Anti-Aging Agent | 3 | 2 | 3 |
| Zinc Oxide | 5 | 5 | 5 |
| Vulcanization Accelerator DM | — | 1 | — |
| Vulcanization Accelerator TMTD | 1 | 1 | 1 |
| Stearic Acid | 2 | 2 | 2 |
| Hexamethoxymethylolmelamine | — | 3 | — |

Details of components in Table 2 are as follows.

Chloroprene rubber: "PM-40" manufactured by Denka Co., Ltd.

Polyamide short fibers: "66 Nylon" manufactured by Asahi Kasei Co., Ltd.

Carbon black: "SEAST 3" manufactured by Tokai Carbon Co., Ltd.

Silica: "Nipsil VN3" manufactured by Tosoh Silica Co., Ltd.

Naphthenic oil: "NS-900" manufactured by Idemitsu Kosan Co., Ltd.

Resorcin-formaldehyde condensate: less than 20% of resorcinol and less than 0.1% of formalin to as an initial position. The upper metal plate 61 was lowered at a speed of 50 mm/min by using the autograph ("AGS-J10kN" manufactured by Shimadzu Corporation), and the compressive force when the distance moved from the initial position of the upper metal plate 61 was 100 mm was measured. The flexibility can be determined to be good as the measured compressive force becomes small. Measurement results are shown in Table 3.

[Test of Durable Running]

Test of durable running was performed by using the power transmission V-belts of Examples 1 to 7 and Comparative Examples 1 to 4, to evaluate belt temperature and belt life. The test of durable running was performed by using a two-axis running test machine including a drive pulley having a diameter of 129 mm and a driven pulley having the same diameter of 129 mm. A power transmission V-belt was hung on the two pulleys, an axial load of the driven pulley was set constant at 120 kgf, and a rotation speed of the drive pulley was set 1,800 rpm. A load of 8 kW was applied to the driven pulley, and the belt was run under an atmosphere of 25° C. until it was broken. Belt temperature during running was measured every 24 hours. The maximum temperature among the measured belt temperatures, time of running life, and a damage form are shown in Table 3.

TABLE 3

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|
| Test for Resistance to Lateral Pressure Compressive Force (N) | 642.5 | 579.5 | 660.2 | 659.9 | 659.5 | 663.2 | 630.5 | 553.9 | 632.4 | 592 | 640 |
| Test for Flexibility Compressive Force (N) | 39.1 | 38.9 | 38.6 | 38.8 | 39 | 39.9 | 37.6 | 38.5 | 40.1 | 39.6 | 43.2 |
| Belt Temperature (° C.) | 55.5 | 56.8 | 55.3 | 56.1 | 57.5 | 58.2 | 53.2 | 57.2 | 65.2 | 62.9 | 63 |
| Running Life (h) | 651 | 601 | 682 | 672 | 665 | 701 | 653 | 498 | 582 | 523 | 550 |
| Damage Form | Cover Fabric Peeling | Cover Fabric Peeling | Cover Fabric Peeling | Cover Fabric Peeling | Cover Fabric Peeling | Cover Fabric Peeling | Rubber Cracking | Interlayer Peeling | Rubber Cracking | Rubber Cracking | Rubber Cracking |

As shown in Table 3, in Examples 1 to 7 in which an unidirectional fiber sheet was buried as a reinforcing layer, resistance to lateral pressure was improved as compared with Comparative Example 1 in which no reinforcing layer was provided, and good flexibility was maintained similar to Comparative Example 1. Since the resistance to lateral pressure could be improved, sufficient resistance to lateral pressure could be ensured even with a small amount of short fibers in the rubber composition as an amount of 5 parts by mass with respect to 100 parts by mass of the rubber component. When Example 1 and Example 2 are compared, Example 1 in which a reinforcing layer was provided on each side of a cord achieved an improvement in resistance to lateral pressure without significantly decreasing flexibility, as compared with Example 2 in which a reinforcing layer was provided only on one side of a cord. Among Examples 1, 3 and 4 in which an unidirectional carbon fiber sheet was buried on each side of a cord, Example 3 in which an unidirectional carbon fiber sheet having a basis weight of 100 g/m² was used and Example 4 in which two unidirectional carbon fiber sheets having a basis weight of 50 g/m² were laminated had higher resistance to lateral pressure and improved running life as compared with Example 1 in which an unidirectional carbon fiber sheet having a basis weight of 50 g/m² was used without lamination. Examples 5 and 6 in which a reinforcing layer was buried in a compression rubber layer exhibited comparable resistance to lateral pressure and running life as in Example 1 in which a reinforcing layer was buried on each side of a cord. It could be confirmed from comparison between Example 1 and Example 7 that a raw edge V-belt could exhibit the same effect as that in a wrapped V-belt. Comparative Examples 2 and 3 in which blinds-like cords were buried as a reinforcing layer had an improved resistance to lateral pressure as compared with Comparative Example 1, but had a lower flexibility than Comparative Example 1 and Examples 1 to 5. It is considered that the decrease in flexibility in Comparative Examples 2 and 3 is caused because the thickness of a reinforcing layer exceeds 0.5 mm and fine yarns are arranged to intersect in a belt width direction. Comparative Example 4 in which a large amount of short fibers were blended had an improved resistance to lateral pressure as compared with Comparative Example 1. However, probably because short fibers had a low orientation property as compared with an unidirectional carbon fiber sheet, flexibility was low and running life was not significantly improved.

When the belt temperature was compared, the belt temperature was kept low in Examples 1 to 7 and Comparative Example 1, but the belt temperature was high in Comparative Examples 2 to 4. This is considered to be caused because a reinforcing layer in Comparative Examples 2 and 3 was formed of a twisted cord and the twisted cord generated a large amount of frictional heat during bending, which led to an increase in the belt temperature. In addition, it is considered that in Comparative Examples 2 and 3, flexibility decreased due to a large thickness of the reinforcing layer and heat generation due to bending was likely to occur, which also led to the increase in belt temperature. In addition, it is considered that in Comparative Example 4, flexibility decreased as a result of blending a large amount of short fibers and heat generation due to bending was likely to occur, which led to the increase in the belt temperature. On the other hand, it is considered that heat generation could be prevented in Examples 1 to 7 as a result of burying a reinforcing layer having a small thickness formed of non-twisted reinforcing fiber filaments. Furthermore, it is also considered that Examples 1 to 7 had an effect of dissipating the generated heat as result of using carbon fibers having high thermal conductivity.

When the running life was compared, Comparative Example 1 was the shortest and Examples 1 to 7 were longer than Comparative Examples 1 to 4. In Comparative Example 1 in which no reinforcing layer was provided, interlayer peeling occurred between a cord and a rubber composition. This is considered to be caused because a belt was deformed by lateral pressure from a pulley due to a low resistance to lateral pressure as a result of not providing a reinforcing layer.

Rubber cracking occurred in Comparative Examples 2 and 3 in which a reinforcing layer formed of a twisted cord was buried and in Comparative Example 4 in which a large amount of short fibers were blended. It is considered that in Comparative Examples 2 to 4, degradation of rubber due to heat was promoted as a result of the increased belt temperature as described above, which led to the rubber cracking.

Examples 1 and 3 to 7 in which a reinforcing layer was provided at two or more locations had longer running life than Example 2 in which a reinforcing layer was provided only at one location. This is considered to be caused because resistance to lateral pressure in Examples 1 and 3 to 7 was more improved than in Example 2.

In Examples 1 to 7, no damage due to interlayer peeling occurred. It is considered that in Examples 1 to 7, adhesion between a rubber composition and a reinforcing layer was good as a result of attaching an adhesive component to the reinforcing layer by an RFL treatment.

Although the present invention has been described in detail with reference to a specific embodiment, it will be apparent to those skilled in the art that various changes and modifications can be made without departing from the spirit and scope of the present invention.

This application is based on Japanese Patent Application 2017-011806 filed on Jan. 26, 2017, and Japanese Patent Application 2018-004453 filed on Jan. 15, 2018, contents of which are incorporated by reference herein.

REFERENCE SIGNS LIST 1, 501, 601, 701, 801, 901 power transmission V-belt
1a, 1b frictional power transmission surface
4 rubber layer
5 cord
6, 406, 906 reinforcing layer
7, 507 adhesion rubber layer
8, 408, 608, 708, 908 compression rubber layer
9, 509, 609, 809 tension rubber layer
10, 210, 310 unidirectional fiber sheet
11 reinforcing fiber filament
12 thermoplastic resin
214, 314 auxiliary yarn

The invention claimed is:

1. A power transmission V-belt having a cross section orthogonal to a belt circumferential direction being a V shape, and having a frictional power transmission surface on each side in a belt width direction,
wherein the power transmission V-belt comprises:
a rubber layer formed of a rubber composition;
a cord buried in the rubber layer along the belt circumferential direction; and
at least one reinforcing layer buried in the rubber layer,
wherein the reinforcing layer comprises a large number of reinforcing fiber filaments having the same length as a belt width; and contains no fibers that intersect with the belt width direction, or contains the fibers that intersect with the belt width direction in a weight per unit area of 30% or less of the reinforcing fiber filaments,
wherein the reinforcing layer has a structure in which the reinforcing fiber filaments are in a non-twisted state, are oriented in the belt width direction, and are spread and bonded in a sheet shape, and
wherein the reinforcing layer has a thickness of 0.05 mm to 0.5 mm.

2. The power transmission V-belt according to claim 1, wherein the reinforcing fiber filaments have a tensile modulus of elasticity of 200 to 600 GPa.

3. The power transmission V-belt according to claim 1, wherein the reinforcing fiber filaments have a thermal conductivity of 5.0 W/(m·K) or more.

4. The power transmission V-belt according to claim 1, wherein the reinforcing fiber filaments are carbon fibers.

5. The power transmission V-belt according to claim 1, wherein the reinforcing layer is buried on each side of the cord in the rubber layer.

6. The power transmission V-belt according to claim 1, wherein the rubber layer comprises:
an adhesion rubber layer in which at least a part of the cord is buried;
a compression rubber layer formed of a rubber composition different from that of the adhesion rubber layer and provided on a belt inner circumferential side of the adhesion rubber layer; and
a tension rubber layer formed of a rubber composition different from that of the adhesion rubber layer and provided on a belt outer peripheral side of the adhesion rubber layer,
wherein the reinforcing layer is buried at least between the adhesion rubber layer and the compression rubber layer or between the adhesion rubber layer and the tension rubber layer.

7. The power transmission V-belt according to claim 6, wherein the cord is not buried in the compression rubber layer, the compression rubber layer comprises short fibers, and the compression rubber layer has a blending amount of the short fibers of 0.1 to 10 parts by mass with respect to 100 parts by mass of a rubber component.

8. The power transmission V-belt according to claim 6, wherein the reinforcing layer is buried in the compression rubber layer or in contact with the compression rubber layer,
wherein the compression rubber layer comprises chloroprene rubber, and
wherein in a case where the reinforcing layer is in contact with the adhesion rubber layer, the adhesion rubber layer contains chloroprene rubber.

9. The power transmission V-belt according to claim 1, wherein the rubber layer comprises:
an adhesion rubber layer in which at least a part of the cord is buried;
a compression rubber layer formed of a rubber composition different from that of the adhesion rubber layer and provided on a belt inner circumferential side of the adhesion rubber layer; and
a tension rubber layer formed of a rubber composition different from that of the adhesion rubber layer and provided on a belt outer peripheral side of the adhesion rubber layer,
wherein the reinforcing layer is buried at least in the compression rubber layer or in the tension rubber layer.

10. The power transmission V-belt according to claim 9, wherein the cord is not buried in the compression rubber layer, the compression rubber layer comprises short fibers, and the compression rubber layer has a blending amount of the short fibers of 0.1 to 10 parts by mass with respect to 100 parts by mass of a rubber component.

11. The power transmission V-belt according to claim 9, wherein the reinforcing layer is buried in the compression rubber layer or in contact with the compression rubber layer,
wherein the compression rubber layer comprises chloroprene rubber, and wherein in a case where the reinforcing layer is in contact with the adhesion rubber layer, the adhesion rubber layer contains chloroprene rubber.

12. The power transmission V-belt according to claim 1, wherein the rubber layer comprises:
a compression rubber layer; and
a tension rubber layer formed of a rubber composition different from that of the compression rubber layer and provided on a belt outer peripheral side of the compression rubber layer,
wherein the cord is buried in the compression rubber layer, in the tension rubber layer, or between the compression rubber layer and the tension rubber layer, and
wherein the reinforcing layer is buried at least in the compression rubber layer, in the tension rubber layer, or between the compression rubber layer and the tension rubber layer.

13. The power transmission V-belt according to claim 12, wherein the cord is not buried in the compression rubber layer, the compression rubber layer comprises short fibers, and the compression rubber layer has a blending amount of the short fibers of 0.1 to 10 parts by mass with respect to 100 parts by mass of a rubber component.

14. The power transmission V-belt according to claim 12, wherein the reinforcing layer is buried in the compression rubber layer or in contact with the compression rubber layer,
wherein the compression rubber layer comprises chloroprene rubber, and
wherein in a case where the reinforcing layer is in contact with an adhesion rubber layer, the adhesion rubber layer contains chloroprene rubber.

15. The power transmission V-belt according to claim 1, wherein the reinforcing layer is formed of one or plurally-laminated unidirectional fiber sheet(s), and
wherein the unidirectional fiber sheet has a structure in which the reinforcing fiber filaments are bonded to each other by a thermosetting resin.

16. The power transmission V-belt according to claim 15, wherein the unidirectional fiber sheet containing the thermosetting resin has a basis weight of 50 to 400 g/m$^2$.

17. The power transmission V-belt according to claim 1, wherein the reinforcing layer is formed of one or plurally-laminated unidirectional fiber sheet(s), and
the unidirectional fiber sheet has a structure in which the reinforcing fiber filaments are bonded to each other by an auxiliary yarn intersecting with the belt width direction and having a weight per unit area being 30% or less of that of the reinforcing fiber filaments.

18. The power transmission V-belt according to claim 17, wherein the unidirectional fiber sheet containing the auxiliary yarn has a basis weight of 50 to 400 g/m$^2$.

19. A method for manufacturing the power transmission V-belt described in claim 1, comprising:
a laminating step of laminating one or plurally-laminated unidirectional fiber sheet(s) each having a structure in which the reinforcing fiber filaments are bonded to each other as the reinforcing layer on a first unvulcanized rubber layer that forms a part of the rubber layer, and thereon laminating a second unvulcanized rubber layer that forms another part of the rubber layer; and
a vulcanizing step of vulcanizing the first unvulcanized rubber layer and the second unvulcanized rubber layer to form the rubber layer.

20. The method for manufacturing the power transmission V-belt according to claim 19, comprising:
attaching an adhesive component to the unidirectional fiber sheet by at least one treatment of an RFL treatment, a rubber cement treatment and a resin impregnation treatment, before the laminating step.

* * * * *